United States Patent
Sainath et al.

(10) Patent No.: US 12,073,824 B2
(45) Date of Patent: Aug. 27, 2024

(54) TWO-PASS END TO END SPEECH RECOGNITION

(71) Applicant: GOOGLE LLC, Mountain View, CA (US)

(72) Inventors: Tara N. Sainath, Jersey City, NJ (US); Yanzhang He, Palo Alto, CA (US); Bo Li, Fremont, CA (US); Arun Narayanan, Milpitas, CA (US); Ruoming Pang, New York, NY (US); Antoine Jean Bruguier, Milpitas, CA (US); Shuo-Yiin Chang, Mountain View, CA (US); Wei Li, Fremont, CA (US)

(73) Assignee: GOOGLE LLC, Mountain View, CA (US)

( * ) Notice: Subject to any disclaimer, the term of this patent is extended or adjusted under 35 U.S.C. 154(b) by 321 days.

(21) Appl. No.: 17/616,135

(22) PCT Filed: Dec. 3, 2020

(86) PCT No.: PCT/US2020/063012
§ 371 (c)(1),
(2) Date: Dec. 2, 2021

(87) PCT Pub. No.: WO2021/113443
PCT Pub. Date: Jun. 10, 2021

(65) Prior Publication Data
US 2022/0238101 A1    Jul. 28, 2022

Related U.S. Application Data

(60) Provisional application No. 62/943,703, filed on Dec. 4, 2019.

(51) Int. Cl.
*G10L 15/00* (2013.01)
*G06N 3/08* (2023.01)
(Continued)

(52) U.S. Cl.
CPC ............. *G10L 15/16* (2013.01); *G06N 3/08* (2013.01); *G10L 15/05* (2013.01); *G10L 15/063* (2013.01);
(Continued)

(58) Field of Classification Search
CPC ....... G10L 15/16; G10L 15/05; G10L 15/063; G10L 15/22; G10L 2015/0635; G06N 3/08; G06N 3/044; G06N 3/045
See application file for complete search history.

(56) References Cited

U.S. PATENT DOCUMENTS 9,799,327 B1 * 10/2017 Chan .................... G10L 15/183
10,176,802 B1 * 1/2019 Ladhak .................. G10L 15/16
(Continued)

FOREIGN PATENT DOCUMENTS

EP    1548705    4/2009
JP    H05204396    8/1993
(Continued)

OTHER PUBLICATIONS

Wang Z, Ma Y, Liu Z, Tang J. R-transformer: Recurrent neural network enhanced transformer. arXiv preprint arXiv:1907.05572. Jul. 12, 2019. (Year: 2019).*
(Continued)

*Primary Examiner* — Douglas Godbold
*Assistant Examiner* — Parker Mayfield
(74) *Attorney, Agent, or Firm* — Gray Ice Higdon

(57) ABSTRACT

Two-pass automatic speech recognition (ASR) models can be used to perform streaming on-device ASR to generate a text representation of an utterance captured in audio data. Various implementations include a first-pass portion of the ASR model used to generate streaming candidate recognition(s) of an utterance captured in audio data. For example, the first-pass portion can include a recurrent neural network
(Continued)

transformer (RNN-T) decoder. Various implementations include a second-pass portion of the ASR model used to revise the streaming candidate recognition(s) of the utterance and generate a text representation of the utterance. For example, the second-pass portion can include a listen attend spell (LAS) decoder. Various implementations include a shared encoder shared between the RNN-T decoder and the LAS decoder.

14 Claims, 10 Drawing Sheets

(51) Int. Cl.
  G10L 15/05 (2013.01)
  G10L 15/06 (2013.01)
  G10L 15/16 (2006.01)
  G10L 15/22 (2006.01)
(52) U.S. Cl.
  CPC ...... *G10L 15/22* (2013.01); *G10L 2015/0635* (2013.01)

(56) References Cited

U.S. PATENT DOCUMENTS

| | | | |
|---|---|---|---|
| 2004/0059575 A1* | 3/2004 | Brookes | G10L 15/08 704/254 |
| 2018/0144749 A1 | 5/2018 | Choi | |
| 2020/0219486 A1 | 7/2020 | Fu | |
| 2020/0265831 A1 | 8/2020 | Wang | |

FOREIGN PATENT DOCUMENTS

| | | |
|---|---|---|
| JP | 2017040919 | 2/2017 |
| WO | 2018071389 | 4/2018 |
| WO | 2018207390 | 11/2018 |

OTHER PUBLICATIONS

Chan W, Jaitly N, Le Q, Vinyals O. Listen, attend and spell: A neural network for large vocabulary conversational speech recognition. In2016 IEEE international conference on acoustics, speech and signal processing (ICASSP) Mar. 20, 2016 (pp. 4960-4964). IEEE. (Year: 2016).*
Narayanan, A. et al., "Recognizing Long-Form Speech Using Streaming End-to-End Models," in IEEE Automatic Speech Recognition and Understanding Workshop (ASRU); pp. 920-927; 2019.
Polyak, B et al., "Acceleration of Stochastic Approximation by Averaging;" SIAM Journal on Control and Optimization, vol. 30, No. 4, pp. 838-855; Jul. 1992.
Abadi et al., "Tensorflow: Large-scale Machine Learning on Heterogeneous Systems;" Software from tensorflow.org; 19 pages; Nov. 9, 2015.
Sainath, Tara N., et al; "Two-Pass End-to-End Speech Recognition," Cornell University Library, arxiv.org, XP081489070, dated Aug. 29, 2019.
Sung, Tzu-Wei; et al.; "Towards End-to-end Speech-to-text Translation with Two-pass Decoding," 2019 ICASSP, pp. 7175-7179, XP033565334, dated May 12, 2019.
Zhou, Shiyu, et al.; "A Comparison of Modeling Units in Sequence-to-Sequence Speech Recognition with the Transformer on Mandarin Chinese," Advances in Databases and Information Systems, Springer International Publishing, XP047496514, dated Nov. 17, 2018.
He, Y. et al., "Streaming End-to-End Speech Recognition for Mobile Devices;" 2019 International Conference on Acoustics, Speech and Signal Processing (ICASSP); 5 pages; May 12, 2019.
Graves, A., "Sequence Transduction with Recurrent Neural Networks;" arXiv.org; arXiv:1211.3711v1; 9 pages; Nov. 14, 2012.
Kim C. et al., "Generation of Large-Scale Simulated Utterances in Virtual Rooms to Train Deep-Neural Networks for Far-Field Speech Recognition in Google Home;" in Proceedings of Interspeech; 5 pages; Aug. 2017.
Shen, J. et al., "Lingvo: A Modular and Scalable Framework for Sequence-to-Sequence Modeling"; CoRR, arXiv:1902.08295; 2019; 17 pages.
Pundak G. et al., "Lower Frame Rate Neural Network Acoustic Models," in Proceedings of Interspeech; 5 pages; 2016.
Chiu, C. et al., "State-of-the-Art Speech Recognition with Sequence-to-Sequence Models," in Proceedings of IEEE International Conference on Acoustics, speech and Signal Processing (ICASSP); pp. 4774-4778, Apr. 2018.
Graves, A. et al., "Speech Recognition with Deep Recurrent Neural Networks," in Proceedings of IEEE International Conference on Acoustics, speech and Signal Processing (ICASSP); pp., 6645-6649; May 2013.
Rao, K. et al., "Exploring Architectures, Data and Units for Streaming End-to-End Speech Recognition with RNN-Transducer," in Proceedings of IEEE Automatic Speech Recognition and Understanding; 7 pages; Dec. 2017.
Chan, W. et al., "Listen, Attend and Spell," CoRR, arXiv.org, arXiv:/1508.01211v2; 16 pages, Aug. 20, 2015.
Kim, S. et al., "Joint CTC-Attention Based End-to-End Speech Recognition Using Multi-Task Learning," in Proceedings of IEEE International Conference on Acoustics, speech and Signal Processing (ICASSP); pp., 4835-4839; Mar. 2017.
Chiu, C-C. et al., "Monotonic Chunkwise Alignments," in Proceedings of International Conference on Learning Representations (ICLR); 16 pages; 2017.
McGraw, I. et al., "Personalized Speech Recognition on Mobile Devices," in Proceedings of IEEE International Conference on Acoustics, speech and Signal Processing (ICASSP); pp. 5955-5959; Mar. 2016.
Aleksic, P. et al., "Bringing Contextual Information to Google Speech Recognition," in . In Proceedings of Interspeech 2015; 5 pages; 2015.
Ortmanns, S. et al., "A Word Graph Algorithm for Large Vocabulary Continuous Speech Recognition," Computer Speech and Language; vol. 11, No. 1; pp. 43-72; Jan. 1997.
Schwartz, R. et al., "A comparison of several approximate algorithms for finding multiple (N-best) sentence hypotheses," in Proceedings of IEEE International Conference on Acoustics, speech and Signal Processing (ICASSP); pp. 701-704; 1991.
Sundermeyer, M. et al., "From Feedforward to Recurrent LSTM Neural Networks for Language Models," IEEE Transactions on Audio, Speech, and Language Processing; vol. 23, No. 3; pp. 517-528, Feb. 2015.
Liu, X. et al., "Two Efficient Lattice Rescoring Methods Using Recurrent Neural Network Language Models;" IEEE Transactions on Audio, Speech, and Language Processing; vol. 24, No. 8; pp. 1438-1449, Aug. 2016.
Kumar, S. et al., "Lattice Rescoring Strategies for Long Short Term Memory Language Models in Speech Recognition," In Proceedings of IEEE Automatic Speech Recognition and Understanding; 8 pages; Dec. 2017.
Kannan, A. et al., "An Analysis of Incorporating an External Language Model into a Sequence-to-Sequence Model," in Proceedings of IEEE International Conference on Acoustics, speech and Signal Processing (ICASSP); pp. 5824-5828; Apr. 2018.
Prabhavalkar, R. et al., "An Analysis of "Attention" In Sequence-to-Sequence Models," in Proceedings of Interspeech 2017; pp. 3702-3706; Aug. 2017.
Chorowski, J. et al., "Attention-Based Models for Speech Recognition," in Proceedings of the 28th International Conference on Neural Information Processing Systems, vol. 28; 9 pages; Dec. 2015.
Prabhavalkar, R. et al., "Minimum Word Error Rate Training for Attention-Based Sequence-to-Sequence Models," in Proceedings of IEEE International Conference on Acoustics, speech and Signal Processing (ICASSP); pp. 4839-4843, Apr. 2018.

(56) References Cited

OTHER PUBLICATIONS

Lowerre, B.T., "The Harpy Speech Recognition System," Ph.D. thesis, Department of Computer Science, Carnegie-Mellon University, Pittsburgh, PA; 125 pages; Apr. 1976.
Miller, R.B., "Response time in man-computer conversational transactions," in Proceedings 1968 Fall Joint Computer Conference, Part I, New York, NY, USA, AFIPS '68 (Fall, part I), pp. 267-277, ACM, Dec. 1968.
Chorowski, J.K. et al., "Towards Better Decoding and Language Model Integration in Sequence to Sequence Models," Interspeech 2017; 6 pages; 2017.
Gonzalvo, X. et al., "Recent Advances in Google Real-time HMM-driven Unit Selection Synthesizer," Interspeech 2016, 5 pages, Sep. 2016.
Pundak, G. et al., "Deep Context: End-to-End Contextual Speech Recognition," in Proceedings of IEEE Spoken Language Technology; pp. 418-425; Dec. 2018.
Vaswani, A. et al., "Attention is all You Need," CoRR, arXiv.org, arXiv:1706.03762v5, Dec. 6, 2017.
Schuster, M. et al., "Japanese and Korean voice search," 2012 IEEE International Conference on Acoustics, Speech and Signal Processing (ICASSP); pp. 5149-5152; Mar. 2012.
European Patent Office; International Search Report and Written Opinion of PCT/US2020/063012; 10 pages; dated Mar. 30, 2021.
Sainath, T. et al., "Two-Pass End-to-End Speech Recognition;" Cornell University, arXiv.org; arXiv:1908.10992v1; 5 pages; Aug. 29, 2019.
Chang, S-Y et al., "Joint Endpointing and Decoding with End-to-End Models;" IEEE International Conference on Acoustics, Speech and Signal Processing (ICASSP); pp. 5626-5630; May 12, 2019.
Williams, I. et al., "Contextual Speech Recognition in End-to-End Neural Network Systems Using Beam Search;" Proceedings of Interspeech 2018; 5 pages; Sep. 2, 2018.
Li, B. et al., "Multi-Dialect Speech Recognition with a Single Sequence-to-Sequence Model," in Proceedings of IEEE International Conference on Acoustics, Speech, and Signal Processing (ICASSP); , pp. 4749-4753; 2018.
Shannon, M. et al., "Improved End-of-Query Detection for Streaming Speech Recognition," in Proceedings of Interspeech 2017; 5 pages.
Chang, S-Y. et al., "Endpoint Detection Using Grid Long Short-Term Memory Networks for Streaming Speech Recognition.," in Proceedings of Interspeech 2017; 5 pages.
Chang, S-Y. et al, "A Unified End-Pointer Using Multitask and Multidomain Training," in Proceedings of IEEE Automatic Speech Recognition and Understanding (ASRU); pp. 100-106; Dec. 2019.
Liao, H. et al., "Large Scale Deep Neural Network Acoustic Modeling with Semi-Supervised Training Data for YouTube Video Transcription," in Proceedings of IEEE Automatic Speech Recognition and Understanding (ASRU); pp. 368-373; Dec. 2013.
Soltau, H. et al., "Neural Speech Recognizer: Acoustic-to-Word LSTM Model for Large Vocabulary Speech Recognition," in Proceedings of Interspeech 2017; 5 pages; Aug. 2017.
Atkinson, K. et al., "VarCon Open Source Dictionary;" http://wordlist.aspell.net/ varcon-readme/; retrieved from internet Oct. 1, 2021; 14 pages; dated Dec. 7, 2020.
Peddinti, V. et al. "Far-Field ASR Without Parallel Data;" in Proceedings of Interspeech 2016; 5 pages; Sep. 2016.
Li, J. et al., "Improving Wideband Speech Recognition using Mixed-bandwidth Training Data in CD-DNN-HMM," in Proceedings of IEEE Spoken Language Technology (SLT); pp. 131-136; Dec. 2012.
Biadsy, F. et al., "Effectively Building Tera Scale MaxEnt Language Models Incorporating Non-Linguistic Signals," in Proceedings of Interspeech 2017; 5 pages; Aug. 2017.
Schuster, M. et al., "Bidirectional Recurrent Neural Networks;" IEEE Transactions on Signal Processing, vol. 45, No. 11; pp. 2673-2681; Nov. 1997.
Graves A. et al., "Bidirectional LSTM Networks for Improved Phoneme Classification and Recognition;" Artificial Neural Networks: Formal Models and Their Applications—ICANN; pp. 799-804; 2005.
European Patent Office; Communication pursuant to Article 94(3) EPC issued in Application No. 20829114.6; 4 pages; dated Nov. 8, 2023.

\* cited by examiner

TWO-PASS END TO END SPEECH RECOGNITION

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

An automated assistant can convert audio data, corresponding to a spoken utterance of a user, into corresponding text (or other semantic representation). For example, audio data can be generated based on the detection of a spoken utterance of a user via one or more microphones of a client device that includes the automated assistant. The automated assistant can include a speech recognition engine that attempts to recognize various characteristics of the spoken utterance captured in the audio data, such as the sounds produced (e.g., phonemes) by the spoken utterance, the order of the pronounced sounds, rhythm of speech, intonation, etc. Further, the speech recognition engine can identify text words or phrases represented by such characteristics. The text can then be further processed by the automated assistant (e.g., using a natural language understanding engine and/or a dialog state engine) in determining responsive content for the spoken utterance. The speech recognition engine can be implemented by the client device and/or by one or more automated assistant component(s) that are remote from, but in network communication with, the client device.

SUMMARY

Techniques described herein are directed towards generating a text representation of a spoken utterance using an end-to-end (E2E) two-pass automatic speech recognition (ASR) model. The two-pass ASR model includes a streaming first-pass portion along with a non-streaming second-pass portion. In many implementations, the first-pass portion includes a recurrent neural network-transformer (RNN-T) decoder and can generate, in a streaming manner, candidate text representation(s) of the spoken utterance. In a variety of implementations, a non-streaming second-pass portion (e.g., one including a listen attend spell (LAS) decoder) can be used to improve the initial candidate text representation(s) generated in the first-pass portion. For example, the LAS decoder can be used to rerank candidate text representations generated using the RNN-T decoder. In many implementations, the two-pass ASR model can include a shared encoder, where the RNN-T decoder and the LAS decoder share the shared encoder. Use of a shared encoder can reduce model size of the two-pass ASR model and/or can provide increased computational efficiency as compared to, for example, using a dedicated encoder for the RNN-T decoder and using a dedicated encoder for the LAS decoder. Put another way, use of the shared encoder can enable efficient utilization of memory and/or computational resources when the two-pass ASR model is utilized in generating a text representation of a spoken utterance. This conservation of memory and/or computational resources can be especially impactful when the two-pass ASR model is stored and utilized by a client device, which often has limited memory and/or computational resources. For example, use of the shared encoder can enable on-device ASR to be performed on client device(s) whose limited resources can prevent (at least in some situations, such as low-battery situations) on-device ASR using other model(s).

As an example, a client device can capture a spoken utterance of "turn on the living room lights" using one or more microphones of the client device. The spoken utterance of "turn on the living room lights" can be processed, in a streaming manner, using the shared encoder to generate shared encoder output, and the shared encoder output can be processed using the RNN-T decoder to generate streaming first-pass candidate text representation(s) of "turn on the living room lights". In response to determining the user has finished speaking, the first-pass candidate text representation(s) along with the shared encoder output can be processed using the LAS decoder to generate the text representation of "turn on the living room lights".

In some implementations, the two-pass model can be trained using a combined loss function which includes both a RNN-T loss and a LAS loss. In some of those implementations, the training process can include: (1) training an encoder and RNN-T decoder; (2) freezing the encoder trained in (1) and using the frozen encoder in training a LAS decoder; and (3) training the shared encoder, the RNN-T decoder, and the LAS decoder at the same time using a combined loss function. In some versions of those implementations, the LAS decoder can additionally be trained using a minimum word error rate (MWER) training process.

In some implementations, the two-pass ASR model can further include an additional encoder. For example, the shared encoder output generated using the shared encoder can be processed using the additional encoder to generate additional encoder output, where the additional encoder adapts the shared encoder output to be more suitable for LAS. The additional encoder output can be processed in the second-pass using the LAS decoder in place of the shared encoder output. Latency (e.g., the delay between the user speaking and generation of results) can be reduced when the LAS decoder processes the additional encoder output compared to when the LAS decoder processes the shared encoder output.

Some implementations disclosed herein are directed to reducing endpointer latency. Endpointing generally references the process of determining when a spoken utterance is complete. Endpointer latency is the amount of time between when the spoken utterance is actually complete and when the endpointing process determines the spoken utterance is actually complete. High endpointer latency can result in delay in generating a response to the spoken utterance. Moreover, with the two-pass ASR model described herein the non-streaming second-pass portion may, since it is non-streaming, process corresponding data until endpointing indicates the spoken utterance is complete. Accordingly, mitigating endpointer latency can enable the second-pass portion to be utilized more quickly, thereby enabling a final text representation to be determined with reduced latency. In various implementations, endpointer latency can be reduced by training the two-pass ASR model (e.g., the RNN-T decoder portion of the ASR model) to predict an end-of-query symbol, such as </s>, and determining the spoken utterance is complete when the end-of-query symbol is predicted. In some implementations, a training penalty can be introduced in training the RNN-T for emitting the end-of-query symbol too early or too late. Accordingly, implementations disclosed herein can train the RNN-T to predict an end-of-query symbol with reduced latency and use the end-of-query symbol as an indication of an endpoint, thereby mitigating endpointer latency. Moreover, training the RNN-T to predict the end-of-query symbol can mitigate the need to use a separate endpointing model. Using a separate endpointing model can require usage of additional computational resources (e.g., memory resources and/or processor resources).

Accordingly, various implementations set for techniques for using a two-pass ASR model in on-device streaming ASR. Conventional ASR systems, for example, can require capturing audio data at a client device, transmitting the audio data and/or a representation of the audio data to a remote server, processing the audio data and/or the representation of the audio data at the remote server to generate a text representation of an utterance captured in the audio data, and transmitting the text representation of the utterance back to the client device. In contrast, on-device ASR systems generate a text representation of an utterance locally at the client device without the need to transmit data to or from a remote server. In many implementations, use of on-device ASR including two-pass ASR models can conserve computational resources (e.g., battery power, processor cycles, memory, etc.) when compared to convention ASR by removing the need to transmit data to and receive data from a remote server. Additionally, on-device ASR can provide user privacy advantages by processing audio data to generate a text representation locally without transmitting the audio data to the remote server. Furthermore, on-device ASR systems provide increased reliability over conventional ASR models. For example, an on-device ASR system can generate a text representation of audio data when a network connection to transmit the audio data to the remote server is unavailable, such as when a wireless network goes down. In contrast, conventional ASR systems are unable to generate a text representation of audio data when a network connection to transmit data to and from the remote server are unavailable.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
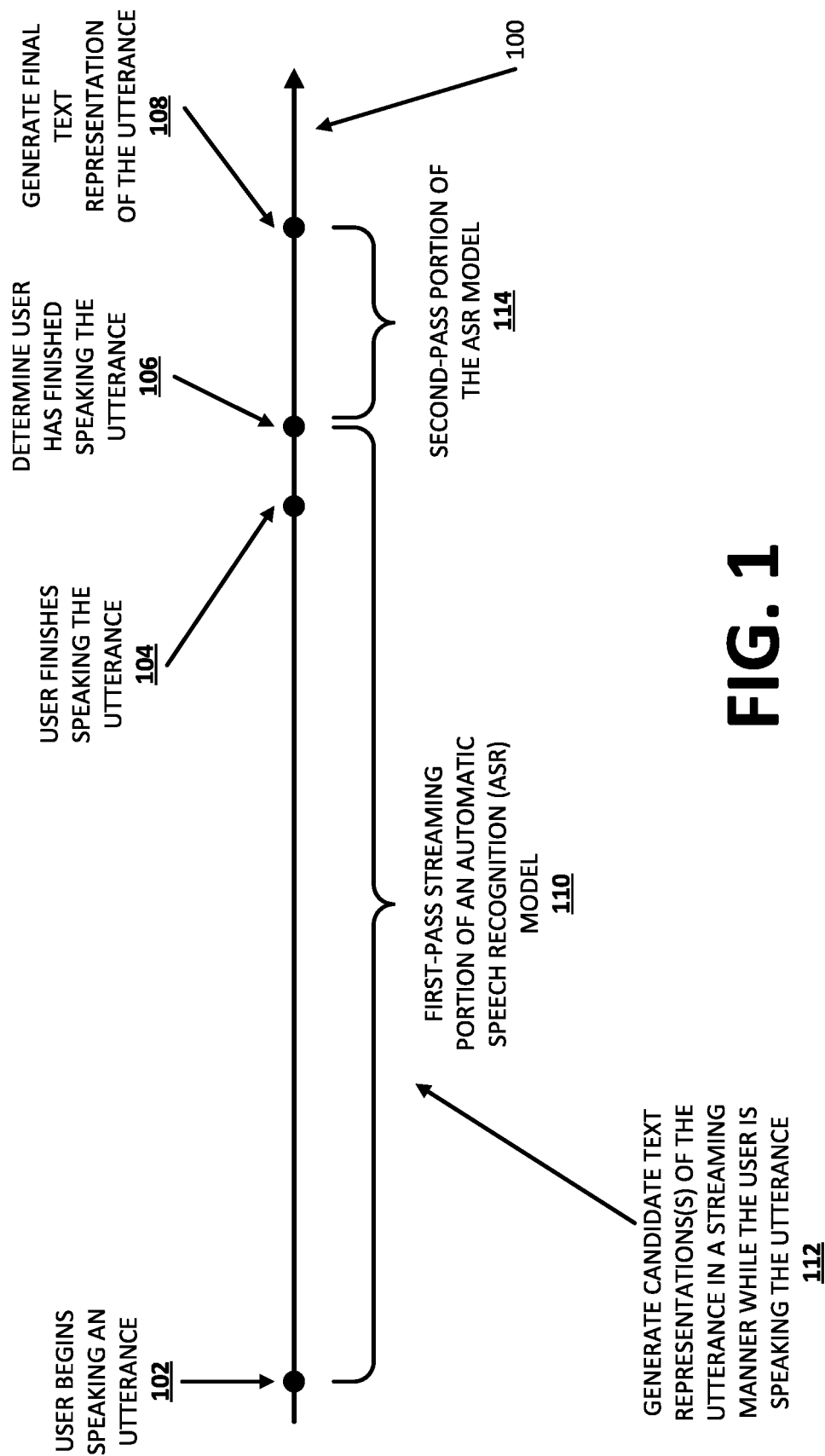
FIG. 1 illustrates an example of generating a text representation of an utterance in accordance with various implementations disclosed herein.

The requirements for many applications of state-of-the-art speech recognition systems can include not only low word error rate (WER) but also low latency. Specifically, for many use-cases, the system must be able to decode utterances in a streaming fashion and faster than real-time. Recently, a streaming recurrent neural network transducer (RNN-T) end-to-end (E2E) model has shown to be a good candidate for on-device speech recognition, with improved WER and latency metrics compared to conventional on-device models. However, this model can still lag behind a large state-of-the-art conventional model in quality. On the other hand, a non-streaming E2E Listen, Attend and Spell (LAS) model has shown comparable quality to large conventional models. Techniques described herein bring the quality of an E2E streaming model closer to that of a conventional system by incorporating a LAS network as a second-pass component, while still abiding by latency constraints.

E2E models for speech recognition, fold the acoustic model (AM), pronunciation model (PM) and language models (LMs) into a single network, and have shown competitive results compared to conventional ASR systems which have separate AM, PM, and LMs. E2E models are particularly attractive for on-device ASR, as they can outperform on-device conventional models of comparable size.

In many implementations, running ASR on-device, with direct user interaction, presents numerous challenges. First, the recognition results must be streaming. That is, words should appear on the screen as soon as they are spoken. Second, the model must have a small latency (i.e., the delay between the user speaking and the text appearing), thus running at or faster than real-time on mobile devices. Third, the model must be able to utilize user context (e.g., list of contacts, song names, etc.) to improve recognition accuracy. A RNN-T E2E model can satisfy these constraints.

Non-streaming E2E models, such as Listen, Attend and Spell (LAS), have shown competitive performance to a large conventional model. However, LAS models are not streaming as they must attend to the entire audio segment, making it challenging to use them in interactive applications.

In two-pass decoding, the second-pass model is often used to improve the initial outputs from first-pass models by using lattice rescoring or n-best reranking. Keeping user-perceived latency low while obtaining the quality gains is the main challenge with applying second-pass models. Language model rescoring is commonly used for multi-pass decoding, but more recently has been used with a LAS model to rescore hypotheses from a first-pass conventional model. The LAS decoder, which takes acoustic information from the encoder and language model information from previous predictions, can be thought of as being strictly stronger than second-pass language models. Thus, techniques described herein explore using the LAS model for second-pass processing.

Specifically, a two-pass architecture in which an RNN-T decoder and a LAS decoder share an encoder network is explored. Sharing the encoder allows reduced model size and computation cost compared with having a dedicated encoder for the RNN-T decoder and a distinct dedicated encoder for the LAS decoder. During inference, the RNN-T decoder produces streaming predictions while the LAS decoder finalizes the prediction. A variety of implementations explore tradeoffs by running the LAS decoder as a beam search versus rescoring hypotheses generated by the RNN-T decoder. In some implementations, computation cost can be reduced by running the first-pass RNN-T model with an adaptive beam and pruning the first-pass lattice before rescoring.

Many implementations can be trained with accented speech to make the model more robust to different pronunciations. In addition, given the increased amount of training data, a varied learning rate schedule is explored. On the latency front, using the end-of-sentence decision emitted by the RNN-T model to close the microphone are explored, and also introduce various optimizations to improve the speed of LAS rescoring.

In many implementations, on-device ASR means that instead of streaming audio from the device to the server, recognizing text on the server, and then streaming results back to the device, recognition is performed entirely on the device. This has important implications for reliability, privacy and latency.

Running an ASR model on-device presents numerous additional user interaction constraints. First, recognition results should be streaming; the recognized words should appear on the screen as they are spoken. Second, the latency, (i.e., the delay between when a user stops speaking and the hypothesis is finalized) must be low. RNN-T models, which meet these on-device constraints, have been shown to be competitive in terms of quality in recent studies. However, under low-latency constraints, they can lag behind a conventional server-side streaming ASR system. At the other end of the spectrum, non-streaming models, such as LAS, have been shown to outperform a conventional ASR system. However, LAS models are not streaming as they must attend to the entire audio segment.

In a variety of implementations, an RNN-T+LAS ASR model can be extended to develop an on-device E2E model that surpasses a conventional model in both WER and latency. First, on the quality-front, the model can be trained on multi-domain audio-text utterance pairs, utilizing sources from different domains (e.g., including search traffic, telephony data, video data, and/or additional domain data). This not only increases acoustic diversity, but also increases the vocabulary seen by the E2E model, as it is trained solely on audio-text pairs which is a small fraction compared to the text-only LM data used by a conventional model. Because the transcription and audio characteristics vary between domains, the domain-id in many implementations can be added as an input to the model. Training with multi-domain data and feeding in a domain-id can improve upon a model trained on voice search data only. Second, also on the quality-front, the model can be trained for improving robustness to different pronunciations. Conventional models handle this by using a lexicon that can have multiple pronunciations for a word. Since E2E models can directly predict word-pieces, different pronunciations can be addressed by including accented English data from different locales. Third, given the increased audio-text pairs used in training, using a constant learning rate rather than gradually decaying the learning rate overtime is explored, thereby giving even weight to the training examples as training progresses.

May implementations disclosed herein can improve latency of the E2E ASR model. Endpointer (EP) latency can be generally defined as the amount of time it takes for the microphone to effectively "close" (e.g., the microphone may not actually close but, rather, the current utterance being processed may be considered complete) after a user stops speaking. Typically, an external voice activity detector (VAD) is used to make microphone-closing decisions. For conventional ASR systems, an end-of-query (EOQ) endpointer is often used for improved EP latency. Integrating the EQQ endpointer into the E2E model by predicting the end-of-query symbol (e.g., </s>) to aid in closing the microphone can improve latency. In many implementations, a penalty in RNN-T training can be introduced for emitting the end-of-query symbol (e.g., </s>) too early or too late. Second, the computation latency of the 2nd-pass rescoring model can be improved. Specifically, the 2nd-pass run time of LAS can be reduced by batching inference over multiple arcs of a rescoring lattice, and also offloading part of the computation to the first-pass. LAS rescoring can also obtain better tradeoff between WER and EP latency due to the improved recognition quality.

Figure 2:
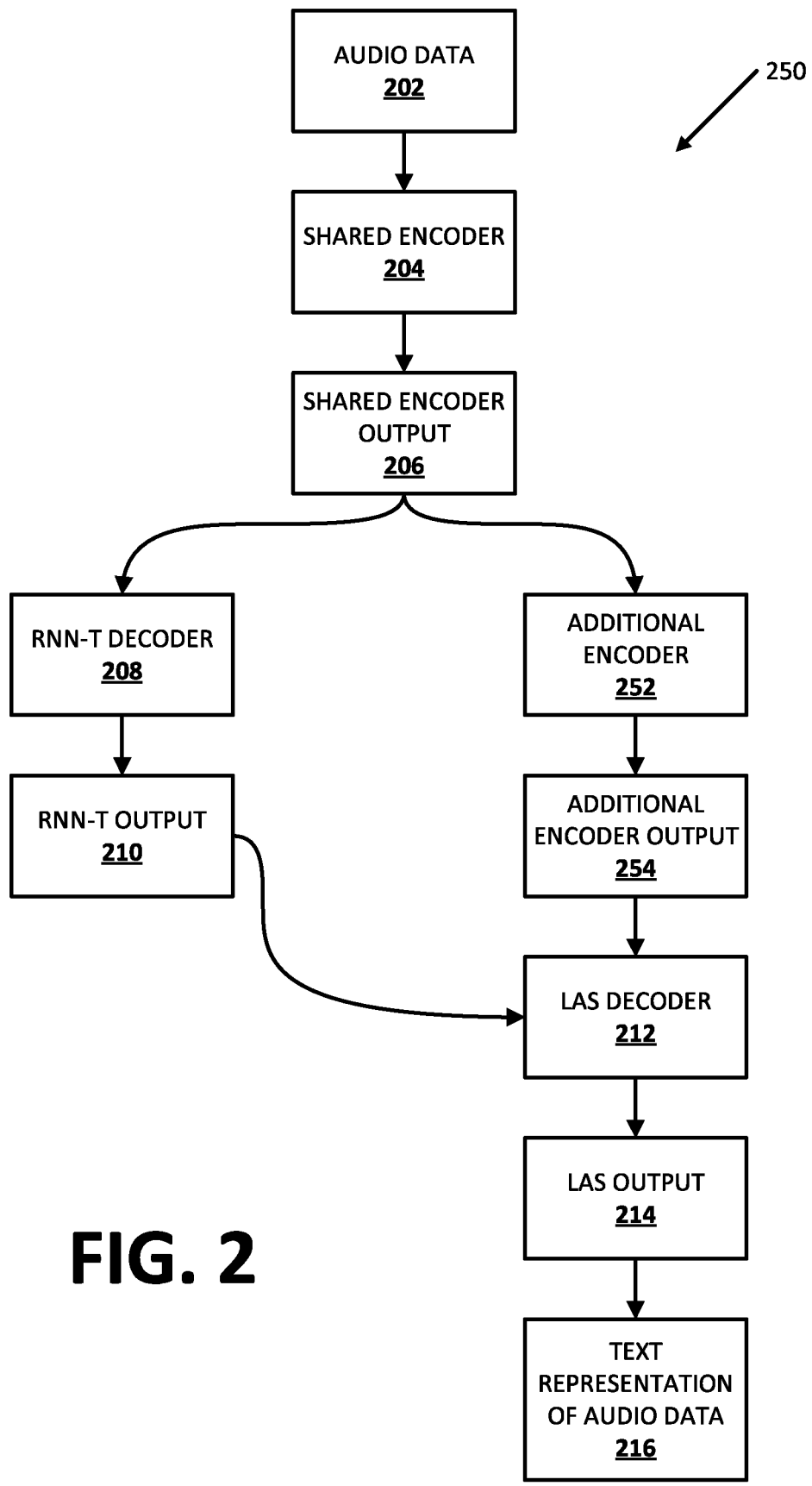
FIG. 2 illustrates an example of generating a text representation of an utterance using a two-pass ASR model in accordance with various implementations disclosed herein.

A two-pass E2E architecture in accordance with many implementations is illustrated in FIG. 2. Input acoustic frames can be denoted as $x=x_1 \ldots x_T$), where $x_t \in \mathbb{R}^d$ are, for example, stacked log-mel filterbank energies (d=512) and T the number of frames in x. In the 1st-pass, each acoustic frame $x_t$ is passed through a shared encoder, including a multi-layer LSTM, to get output $e_t^s$, which is then passed to an RNN-T decoder that predicts $y_r\{y_1, \ldots y_T\}$, the output sequence, in a streaming fashion. Here $y_r$ is a sequence of word-piece tokens. In the 2nd-pass, the full output of the shared encoder, $e^s=(e_1^s \ldots e_T^s)$, is passed to a small additional encoder to generate $e^a=(e_1^a \ldots e_T^a)$, which is then passed to an LAS decoder. In many implementations, the additional encoder can be added to adapt the encoder output to be more suitable for LAS. During training, the LAS decoder computes output $y_l$ according to $e^a$. During decoding, the LAS decoder rescores multiple top hypotheses from RNN-T, $y_r$, represented as a lattice. Specifically, the LAS decoder can process each lattice arc in the teacher-forcing mode, with attention on $e^a$, to update the probability in the arc. At the end, the top output sequence with the highest probability is extracted from the rescored lattice.

In several implementations, an E2E model can be trained using audio-text pairs only, which is a small fraction of data compared to the trillion-word text-only data a conventional LM is trained with. Previous work used only search utterances. To increase vocabulary and diversity of training data, using more training data can be explored by incorporating multi-domain utterances. These multi-domain utterances span domains of search, farfield, telephony, video, and/or additional domain(s) of utterances. In many implementations, datasets are anonymized and hand-transcribed. Additionally or alternatively, the transcription utterances can be done in a semi-supervised fashion.

One of the issues with using multi-domain data is that each domain has different transcription conventions. For example, search data has numerics in the written-domain (e.g., $100) while other queries are often in the spoken domain (e.g., one hundred dollars). Another issue is with respect to multiple speakers. Search queries contain only one speaker per utterance, while other queries contain multiple speakers. Since a goal of some implementations is to improve the quality of search queries, feeding a domain-id to the E2E model as a one-hot vector, with the id being one of the domains is explored. In many implementations, it is adequate to only feed the domain-id to the shared encoder.

Conventional ASR systems can operate on phonemic representations of a word. Specifically, a lexicon maps each word in the vocabulary to a few pronunciations, represented as a sequence of phonemes, and this mapping is fixed before training. This poses challenges when it comes to accents. For example, building an English recognizer that is accurate for American, Australian, British, Canadian, Indian, and Irish English variants is challenging because of phonetic variations.

Attempting to solve these issues by merging the phoneme sets is difficult. Using a lexicon with an on-device E2E system significantly increases the memory footprint, since the size of the lexicon can be very large (e.g. be upwards of 0.5 GB). In addition, the increased number of phonemes causes confusion and creates data sparsity problems. Finally, decisions regarding the phoneme set and the pronunciations of a word are not made directly from data.

Instead, implementations disclosed herein directly predicts word pieces. The model itself decides how to handle pronunciation and phonetic variations based on data. Its size is fixed regardless of the number of variants. As a simple strategy to improve robustness to different accents, including additional training data from different English-accented locales can be explored, using the same data as described in. For example, data from Australia, New-Zealand, United Kingdom, Ireland, India, Kenya, Nigeria and South Africa can be utilized. The data proportion from these locales can be down-weighted, for example, by a factor of 0.125 during training. This number was chosen empirically to be the largest value that did not degrade performance on the American English set.

Spelling conventions vary from one variant of English to another. Since the training data was transcribed using the spelling convention of the locale, using the raw transcript can potentially cause unnecessary confusion during training. For example, the E2E model might try to learn to detect the accent in order to decide which spelling convention to use, thus degrading robustness. Instead, in some implementations VarCon can be used to convert the transcripts to the American spelling convention. For each word in the target, VarCon's many-to-one mapping for conversion can be used, and then use the converted sentence as a target. In addition, during inference when evaluating accented test sets, all reference transcripts can be converted to the American spelling as well.

In many implementations, an exponentially-decaying learning rate can be used when training both RNN-T and LAS. Given the increased amount of multi-domain training data compared to search-only data, a variety of implementations use a constant learning rate. To help the model converge, an exponential moving average (EMA) of the weights can be maintained during training and the EMA weights can be used for evaluation.

An external voice activity detector (VAD)-based endpointer is often used to detect speech and filter out non-speech. It declares an end-of-query (EOQ) as soon as the VAD observes speech followed by a fixed interval of silence. EOQ-based endpointers which directly predict an end-of-query symbol (e.g., </s>) can improve latency. In many implementations, the EOQ detector can also be folded into the E2E systems for joint endpointing and recognition by introducing a </s> token into the training target vocabulary of the RNN-T model. During beam search decoding, </s> is a special symbol that signals the microphone should be closed. Premature prediction of </s> causes deletion errors, while late prediction increases latency.

In several implementations, the joint RNN-T endpointer (EP) model can be extended and the above issue can be addressed by applying additional early and late penalties on the </s> token. Specifically, during training for every input frame in $x=\{x_1, \ldots, x_T\}$ and every label $y=\{y_1, \ldots, y_T\}$, RNN-T computes a U×T matrix $P_{RNN-T}(y|x)$, which is used in the training loss computation. Here label $y_U$ is </s>, the last label in the sequence. $t_{</s>}$ can be denoted as the frame index after the last non-silence phoneme, obtained from the forced alignment of the audio with a conventional model. The RNN-T log-probability $R_{RNN-T}(y_U|x)$ is modified to include a penalty at each time step t for predicting </s> too early or too late. $t_{buffer}$ gives a grace period after the reference $t_{</s>}$ before this late penalty is applied, while $\alpha_{early}$ and $\alpha_{late}$ are scales on the early and late penalties respectively. All hyperparameters can optionally be tuned experimentally.

$$\log P_{RNN-T}(y_U|x_t) + \max(0, \alpha_{early} * (t_{</s>} - t)) + \quad (1)$$
$$\max(0, \alpha_{late} * (t - t_{</s>} - t_{buffer}))$$

In a variety of implementations, the RNN-T model is trained on a mix of data from different domains. This poses a challenge for the endpointer models as different applications may require different endpointing behaviors. Endpointing aggressively for short search-like queries is preferable, but can result in deletions for long-form transcription tasks like video. Since the goal of some implementations is to improve the latency of search queries, the fed-in domain-id can be utilized to only add the </s> token for the search queries, which addresses the latency on search queries while not affecting other domains.

In several implementations, LAS rescoring can be applied to a tree-based lattice, instead of rescoring an N-best list, for efficiency, as it avoids duplicate computation on the common prefixes between candidate sequences. The LAS latency can be further reduced with batch inference of the arcs when expanding each lattice branch for rescoring, as it utilizes matrix-matrix multiplication more efficiently. Furthermore, the 2nd-pass latency can be reduced by offloading the computation of the additional encoder as well as the attention source keys and values to the 1st-pass in a streaming fashion, whose outputs are cached to be used in the 2nd-pass.

As one specific example of model parameters and/or training parameters, in some implementations, RNN-T+ LAS models can be trained using a 128-dimensions log-mel feature frontend. The features are computed using 32 msec windows with a 10 msec hop. Features from 4 contiguous frames are stacked to form a 512 dimensional input representation, which is further sub-sampled by a factor of 3 and passed to the model. LSTM layers in the model are unidirectional, with 2,048 units and a projection layer with 640 units. The shared encoder can include 8 LSTM layers, with a time-reduction layer after the 2nd-layer. The RNN-T decoder includes a prediction network with 2 LSTM layers, and a joint network with a single feed-forward layer with 640 units. The additional LAS-specific encoder includes 2 LSTM layers. The LAS decoder includes multi-head attention with 4 attention heads, which is fed into 2 LSTM layers. Both decoders can be trained to predict 4,096 word pieces.

Continuing with the specific example, the RNN-T model can have a large quantity of parameters, such as 120 M parameters. The additional encoder and the LAS decoder can also have a large quantity of parameters, but optionally less parameters than the RNN-T model (e.g., the additional encoder and the LAS decoder can have 57 M parameters). All parameters can be quantized to 8-bit fixed-point. The total model size in memory/disk can be, for example, 177 MB.

In addition to diverse training sets, multi-condition training (MTR) and random data down-sampling to 8 kHz can also be used to further increase data diversity. Noisy data can be generated at signal-noise-ratio (SNR) from 0 to 30 dB, with an average SNR of 12 dB, and with T60 times ranging from 0 to 900 msec, averaging 500 msec. Noise segments can be sampled from videos and/or daily life noisy environmental recordings. Both 8 kHz and 16 kHz versions of the data can be generated, each with equal probability, to make the model robust to varying sample rates.

Turning now to the figures, FIG. 1 illustrates an example of a two-pass ASR process in accordance with many implementations. FIG. 1 includes a horizontal axis 100 representing time, and includes points of time 102, 104, 106, and 108. A first point of time 102 indicates where a user begins speaking an utterance, and is followed by a second point of time 104 which indicates the user has finished speaking the utterance. Point of time 106 provides an indication of when the two-pass ASR system determines the user has finished speaking the utterance, and this follows time 104. In the illustrated example, the duration between time 104 and time 106 (i.e., the time it takes the system to determine the user has finished speaking) is much shorter than the duration between time 102 and 104 (i.e., the amount of time the user is speaking the utterance). Additionally or alternatively, point of time 108 indicates when the system generates a text representation of the utterance, where time 108 follows time 106.

In some implementations, the first-pass streaming portion of the ASR model 110 is the duration between time 102 and time 106 (i.e., the time from when the user begins speaking the utterance and the system determines the user has finished speaking the utterance). In the illustrated example, the first-pass streaming portion of the ASR model 110 begins when the user begins speaking. However, this is merely illustrative and the first-pass streaming portion 110 can begin slightly after the user begins speaking (e.g., the first-pass portion 110 can begin 0.01 seconds, 0.05 seconds, 0.1 seconds, 0.5 seconds, 1 second, and/or additional durations after the user begins speaking). Similarly, in the illustrated example, the first-pass streaming portion 110 ends when the system determines the user has finished speaking the utterance 106. However, this is merely illustrative and the first-pass streaming portion 110 can end slightly after the system determines the user has finished speaking the utterance 106 (e.g., the first-pass portion 110 can end 0.01 seconds, 0.05 seconds, 0.1 seconds, 0.5 seconds, 1 second, and/or additional durations after the system determines the user has finished speaking). In many implementations, the ASR system generates one or more candidate streaming text representation(s) of the utterance 112 in a streaming manner while the user is speaking the utterance. In some implementations, the first-pass streaming portion of the ASR model 110 includes a shared encoder and a RNN-T decoder. Additionally or alternatively, the first-pass streaming portion of the ASR model 110 can include an additional encoder in addition to the shared encoder and the RNN-T decoder.

In some implementations, the second-pass portion of the ASR model 114 is the duration between time 106 and time 108 (i.e., the time from when the system has determined the user has finished speaking the utterance and when the system generates the final text representation of the utterance). In the illustrated example, the second-pass portion 114 begins when the system determines the user has finished speaking the utterance 106. However, this is merely illustrative and the second-pass streaming portion 114 can begin slightly after the system determines the user has finished speaking (e.g., the second-pass portion 114 can begin 0.01 seconds, 0.05 seconds, 0.1 seconds, 0.5 seconds, 1 second, and/or additional durations after the system determines the user has finished speaking). In some implementations, the second-pass portion 114 includes a LAS decoder, where the LAS decoder can refine the candidate text representation(s) generated in a streaming manner during the first-pass by processing output generated in the first-pass portion such as output generated using the shared encoder and/or output generated using the additional encoder.

FIG. 2 is a block diagram illustrating another example process 250 of generating a text representation of audio data using a two-pass ASR model. A first-pass portion of the ASR model can include processing audio data 202, capturing the utterance spoken by the human, using a share encoder 204 to generate shared encoder output 206, as well as processing the shared encoder output 206 using the RNN-T decoder 208 to generate RNN-T output 210. Additionally or alternatively, the first-pass portion can include processing the shared encoder output 206 using an additional encoder 252 to generate additional encoder output 254. In many implementations, the additional encoder output 254 can encode the shared encoder output 206 such that the additional encoder output 254 is more suitable for processing using the LAS decoder 212.

In many implementations, the second-pass portion is non-streaming and can include processing the additional encoder output 254 along with the RNN-T output 210 using the LAS decoder 212 to generate LAS output 214. A final text representation 216 of the utterance captured in the audio data can be generated based on LAS output 214.

Figure 3:
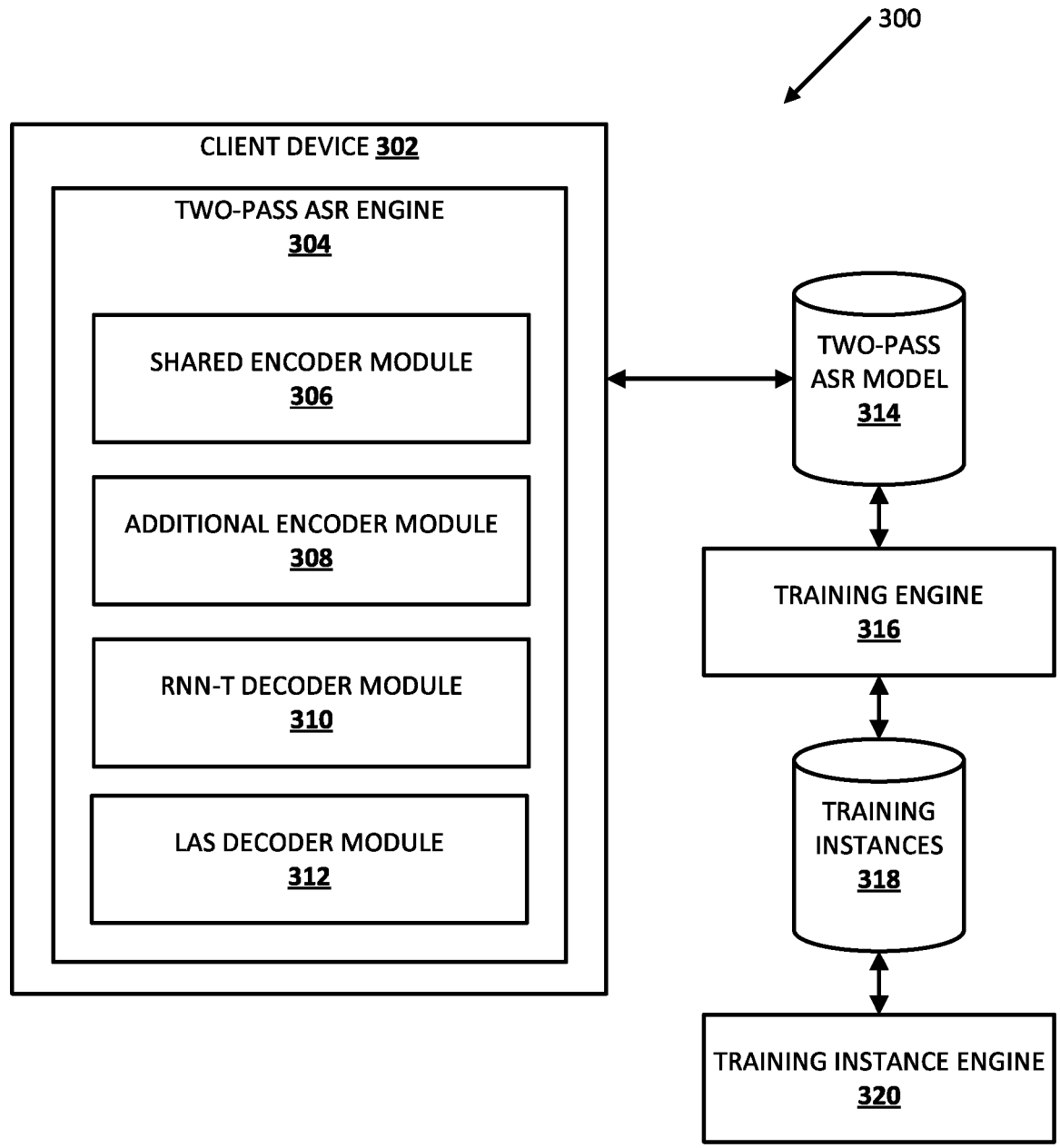
FIG. 3 illustrates a block diagram of an example environment in which implementations disclosed herein may be implemented.

FIG. 3 illustrates an example environment 300 in which implementations disclosed herein can be implemented. FIG. 3 includes a client device 302. In many implementations, client device 302 can execute an instance of an automated assistant (not depicted). The client computing device 302 may be, for example: a desktop computing device, a laptop computing device, a tablet computing device, a mobile phone computing device, a computing device of a vehicle of the user (e.g., an in-vehicle communications system, and in-vehicle entertainment system, an in-vehicle navigation system), a standalone interactive speaker, a smart appliance such as a smart television, and/or a wearable apparatus of a user that includes a computing device (e.g., a watch of the user having a computing device, glasses of the user having a computing device, a virtual or augmented reality computing device). Additional and/or alternative client computing devices may be provided.

Example environment 300 includes two-pass ASR engine 304, shared encoder module 306, additional encoder module 308, RNN-T decoder module 310, LAS decoder module 312, training engine 316, training instance engine 320, two-pass ASR model 314, training instances 318 and/or additional or alternative engine(s) and/or model(s) (not depicted). Two-pass ASR engine 304, shared encoder module 306, additional encoder module 308, RNN-T decoder module 310, and LAS decoder module 312 are example components in which techniques described herein may interface. In some implementations, one or more aspects of one or more engines and/or modules 304, 306, 308, 310, 312, and 316 of FIG. 3 may be combined. For example, aspects of shared encoder module 306 may be combined with aspects of additional encoder module 308.

Training instance engine 320 can generate training instances 318. For example, training instance engine 320 can generate one or more training instances, where each training instance includes audio data capturing an utterance and a ground truth text representation of the utterance. In some implementations, training instances 318 can be generated by training instance 320 in accordance with process 400 of FIG. 4 described herein.

In some implementations, two-pass ASR model 314 can include a shared encoder portion, an additional encoder portion, a RNN-T decoder portion, and a LAS decoder portion (e.g., the two-pass ASR model can be in accordance with the model illustrated in FIG. 2 as described herein). For example, training engine 316 can train the two-pass ASR model 314 by: (1) training the shared encoder and the RNN-T decoder portions in accordance with process 500 of FIG. 5, (2) training the additional encoder and LAS decoder using the shared encoder trained in step (1), where the shared encoder is frozen during training of the additional encoder and the LAS decoder in accordance with process 650 of FIG. 6, and (3) refining the trained shared encoder, additional encoder, RNN-T decoder, and LAS decoder using a common loss in accordance with process 750 of FIG. 7. In some implementations, training engine 316 can further refine the LAS decoder portion using mean word error rate (MWER) training.

Figure 8:
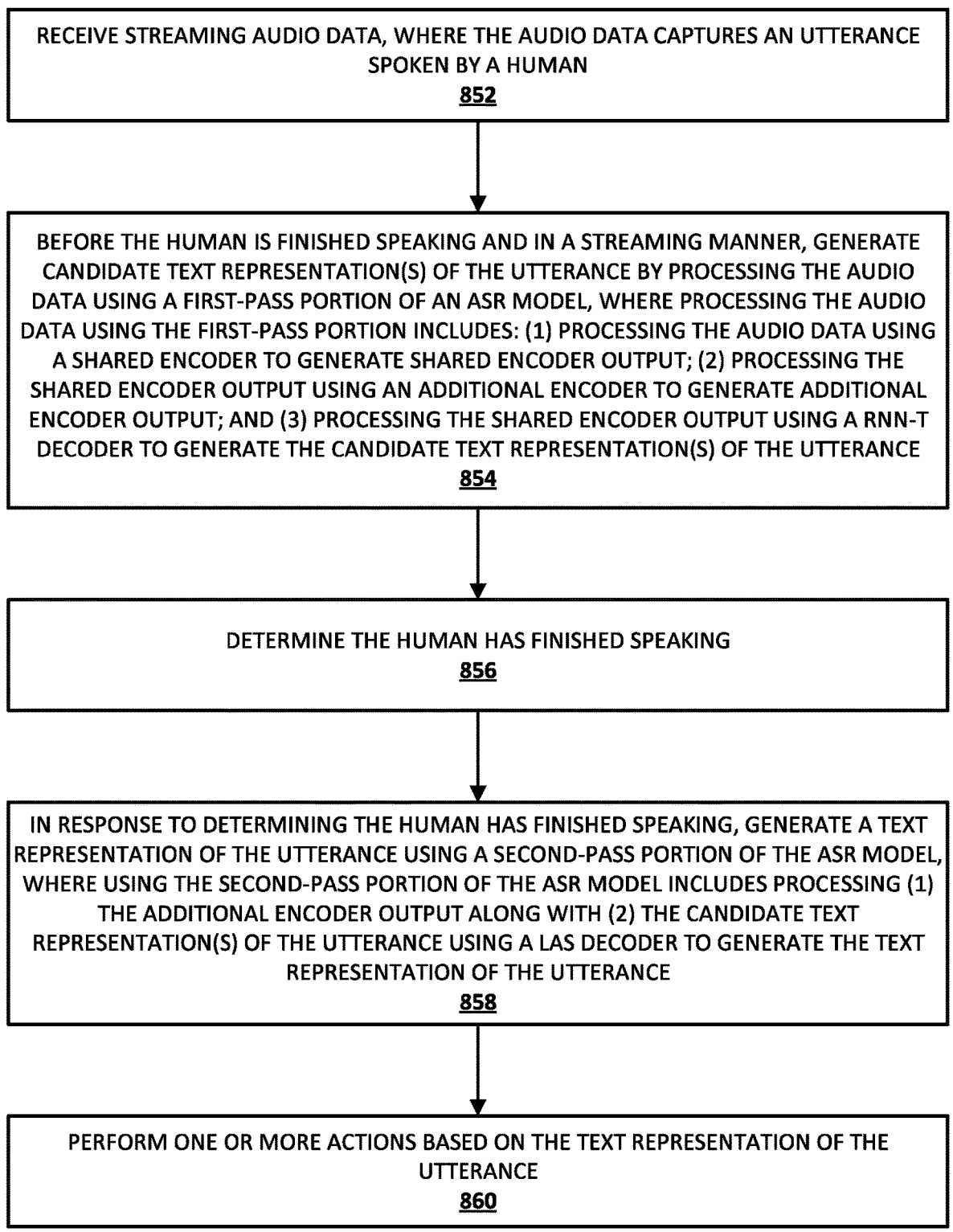
FIG. 8 is a flowchart illustrating an example process of generating a text representation of an utterance using a two-pass ASR model in accordance with implementations disclosed herein.

Generating a text representation of an utterance is described herein with respect to process 850 of FIG. 8. Two-pass ASR engine 304 can generate a text representation of captured audio data using two-pass ASR model 314. In some implementations, shared encoder module 306 of two-pass ASR engine 304 can process captured audio data using the shared encoder portion of two-pass ASR model 314 to generate shared encoder output in a streaming manner. Additionally or alternatively, shared encoder module 306 can store streaming encoder output in a buffer for additional use by two-pass ASR engine 304, such as for use by additional encoder module 308, LAS decoder module 312, and/or additional portion(s) of two-pass ASR engine 304. Additional encoder module 308 can process shared encoder output using the additional encoder portion of two-pass ASR model 314 to generate additional encoder output. In some implementations, additional encoder module 308 can process shared encoder output in a streaming manner as the shared encoder output is generated using shared encoder module 306. In some other implementations, additional encoder module 308 can process shared encoder output stored in a buffer by shared encoder module 306.

RNN-T decoder module 310 can process shared encoder output using the RNN-T decoder portion of the two-pass ASR model 314 to generate one or more candidate text representations of the utterance. In some implementations, RNN-T decoder module 310 can process shared encoder output generated in a streaming manner by shared encoder module 306. LAS decoder module 312 can generate the text representation of the utterance by processing candidate text representation(s) of the utterance generated using RNN-T decoder module along with either shared encoder output stored in a buffer using shared encoder module 306 or additional encoder output generated using additional encoder module 308.

Figure 4:
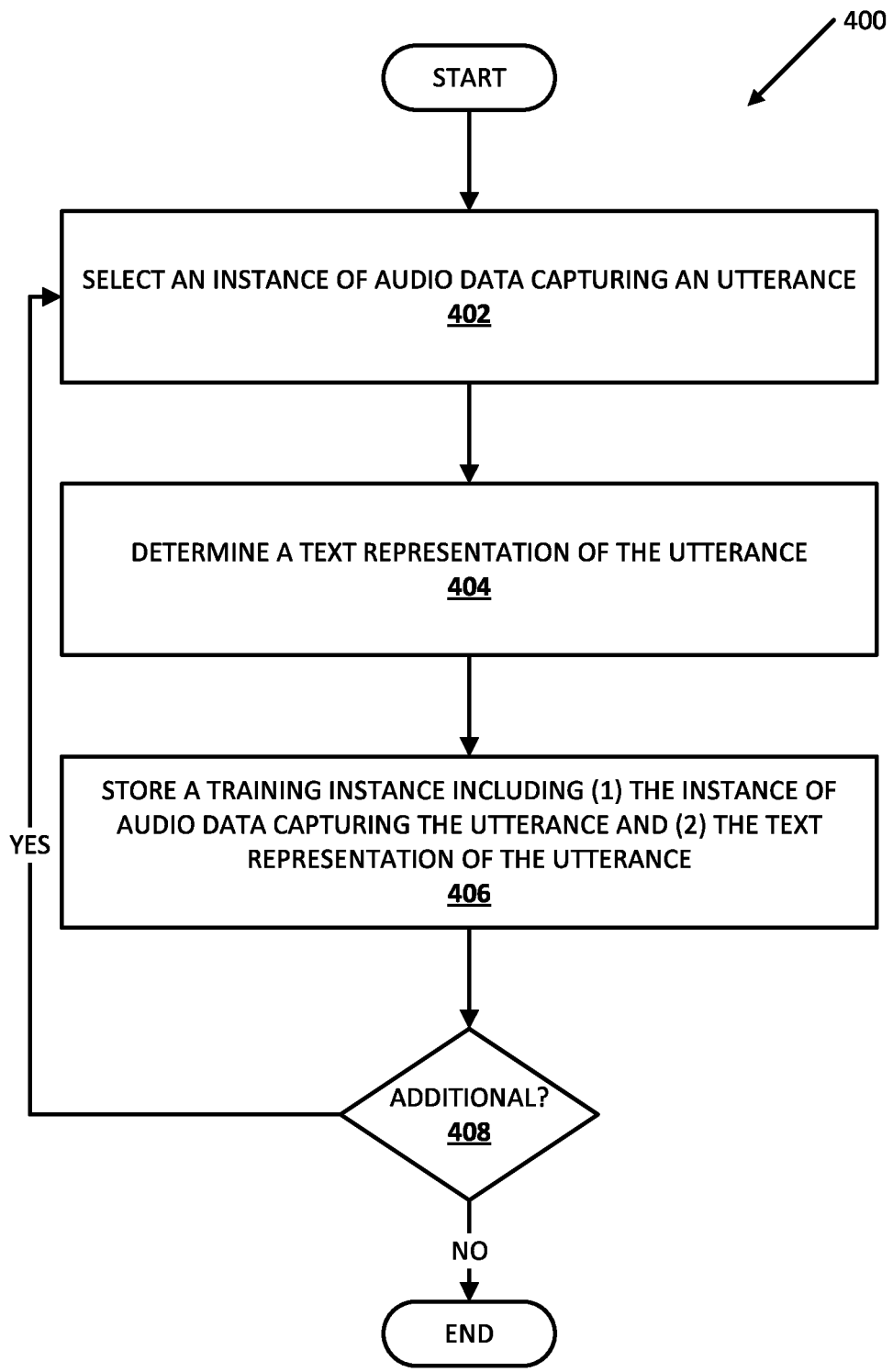
FIG. 4 is a flowchart illustrating an example process of generating a training instance, for training a two-pass ASR model, in accordance with various implementations disclosed herein.

FIG. 4 is a flowchart illustrating a process 400 of generating one or more training instances which can be used to train a two-pass ASR model in accordance with various implementations. For convenience, the operations of the flowchart are described with reference to a system that performs the operations. This system may include one or more components, such as one or more processors (e.g., CPU(s), GPU(s), and/or TPU(s)). While operations of process 400 are shown in a particular order, this is not meant to be limiting. One or more operations may be reordered, omitted, and/or added.

At block 402, the system selects an instance of audio data capturing an utterance. For example, the instance of audio data can capture a human speaking the utterance "Turn the thermostat up three degrees".

At block 404, the system determines a text representation of the utterance. In many implementations, the text representation of the utterance can be determined by a human reviewer of the selected instance of audio data. Additionally or alternatively, the text representation of the utterance can be determined using an additional ASR system. In many implementations, the text representation of the audio data can be determined using an additional ASR system where the generated text representation is reviewed for accuracy by a human reviewer.

At block 406, the system stores a training instance including (1) the instance of audio data capturing the utterance and (2) the text representation of the utterance.

At block 408, the system determines whether to generate any additional training instances. If so, the system proceeds back to block 402, selects an additional instance of audio data capturing an utterance, before proceeding to blocks 404 and 406 using the additional instance of audio data. In many implementations, the system can determine whether to generate additional training instance(s) based on whether one or more conditions are satisfied, such as whether a threshold number of training instances have been generated, whether there are any remaining unprocessed instances of audio data, and/or whether additional condition(s) are satisfied. If, at block 408, the system determines to not generate any additional training instances, the process ends.

Figure 5:
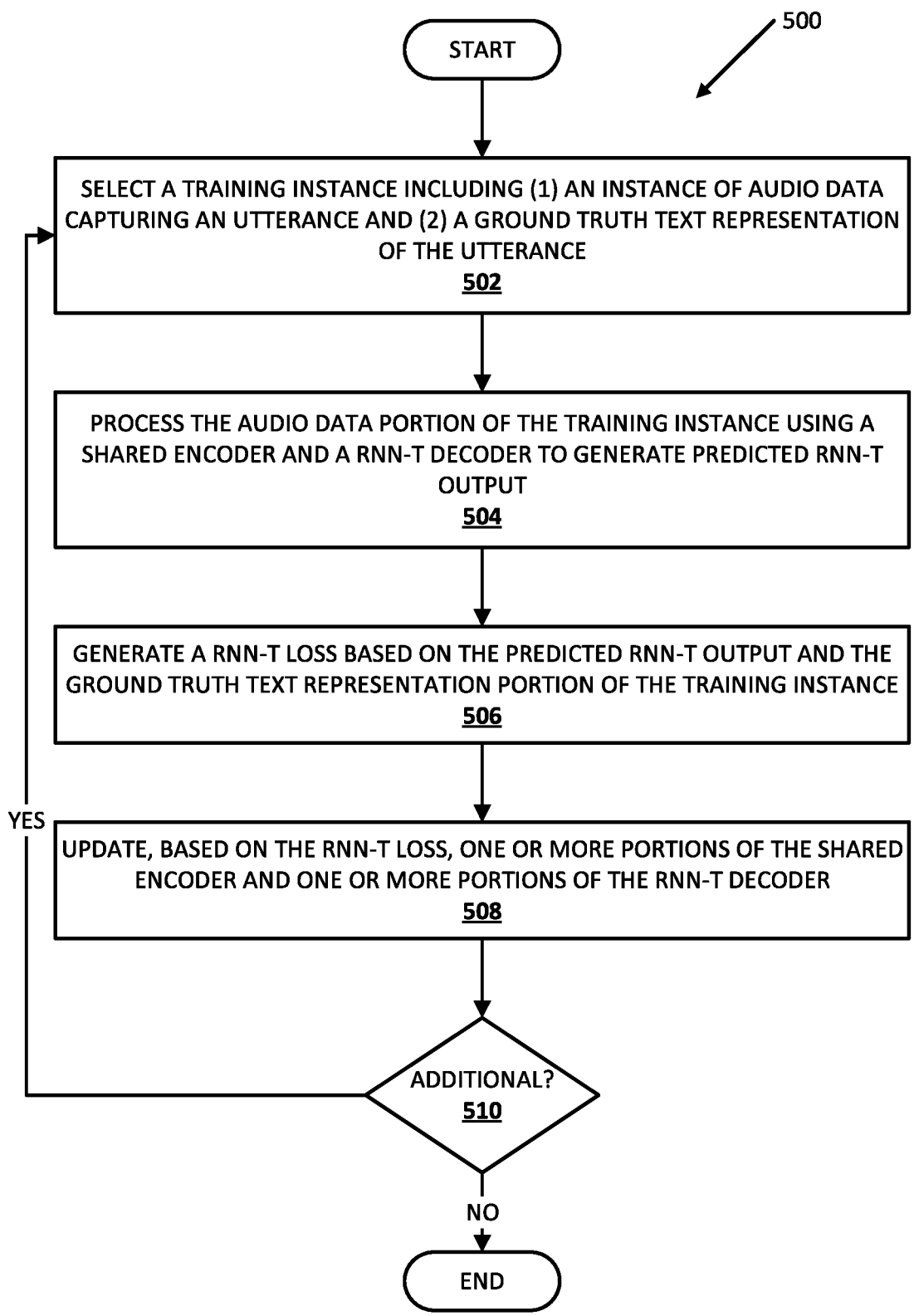
FIG. 5 is a flowchart illustrating an example process of training a first-pass portion of a two-pass ASR model in accordance with implementations disclosed herein.

FIG. 5 is a flowchart illustrating a process 500 of training a shared encoder and a RNN-T decoder of a two-pass ASR model in accordance with various implementations. For convenience, the operations of the flowchart are described with reference to a system that performs the operations. This system may include one or more components, such as one or more processors (e.g., CPU(s), GPU(s), and/or TPU(s)). While operations of process 500 are shown in a particular order, this is not meant to be limiting. One or more operations may be reordered, omitted, and/or added.

At block 502, the system selects a training instance including (1) an instance of audio data capturing an utterance and (2) a ground truth representation of the utterance. In some implementations, the training instance can be generated in accordance with process 400 of FIG. 4.

At block 504, the system processes the audio data portion of the training instance using the shared encoder to generate shared encoder output, and can process the shared encoder output using the RNN-T decoder to generate predicted RNN-T output.

At block 506, the system generates a RNN-T loss based on the predicted RNN-T output and the ground truth text representation portion of the training instance.

At block 508, the system updates, based on the RNN-T loss, one or more portions of the shared encoder and/or one or more portions of the RNN-T decoder.

At block 510, the system determines whether to perform additional training. If so, the system proceeds back to block 502, the selects an additional training instance before proceeding to blocks 504, 506, and 508 using the additional training instance, before performing an additional iteration of block 510. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although process 500 is described with respect to a non-batch learning technique, batch learning may additionally and/or alternatively be utilized. If, at block 510, the system determines to not perform additional training, the process ends.

In some implementations, the RNN-T decoder can be trained to generate an end of query token, such as </s>. In some of those implementations, the RNN-T decoder can be trained with a training penalty for predicting the end of query token too early or too late. For example, the training instance can include audio data capturing the utterance of "what is the weather tomorrow". A training penalty can be used when the predicted RNN-T output predicts the end of query token too early, such as RNN-T output of "what is the weather </s>". Similarly, a training penalty can be used when the predicted RNN-T output predicts the end of query token too late, such as RNN-T output of "what is the weather tomorrow [pause] [pause] </s>".

Figure 6:
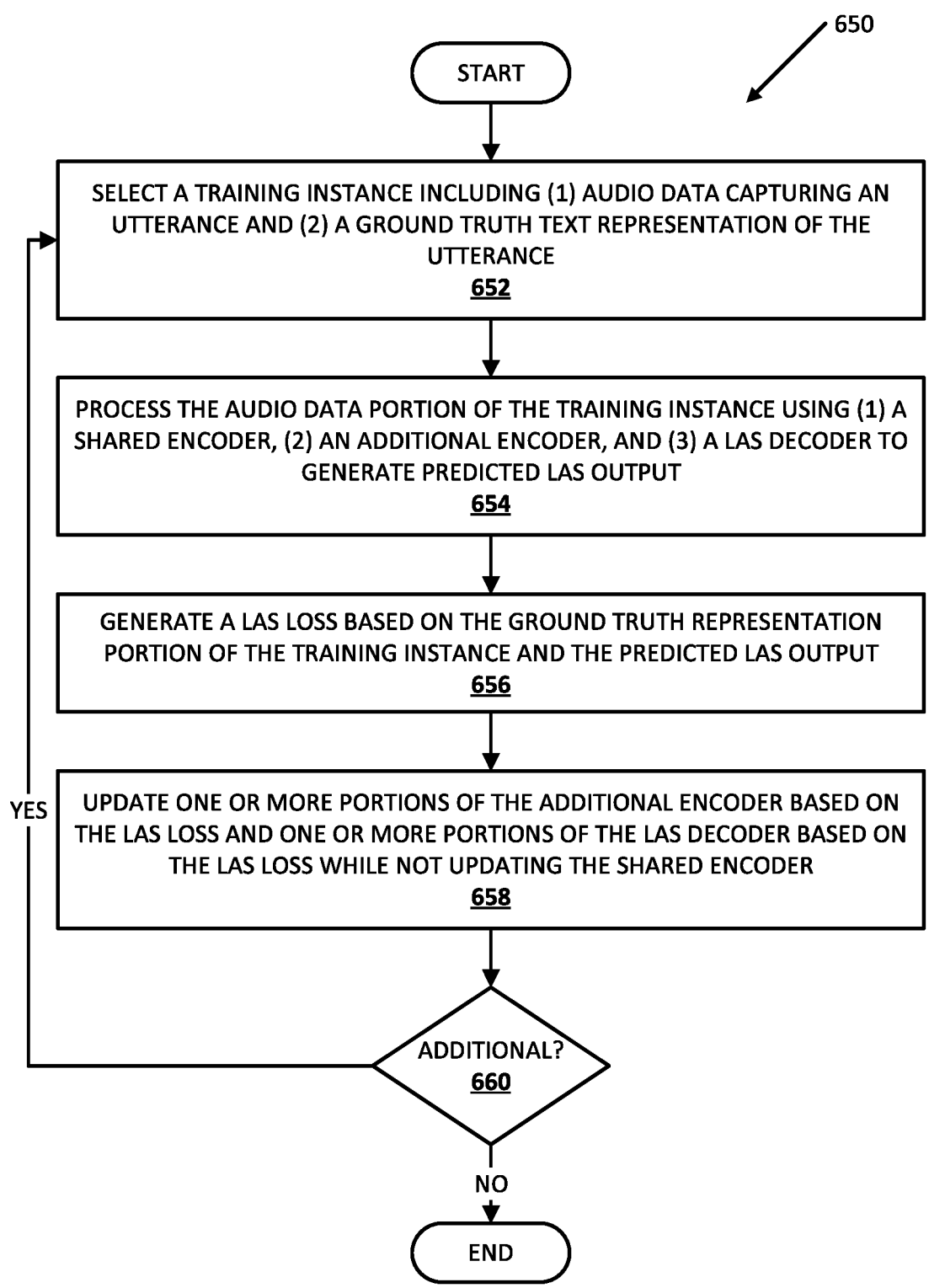
FIG. 6 is a flowchart illustrating an example process of training a second-pass portion of a two-pass ASR model in accordance with implementations disclosed herein.

FIG. 6 is a flowchart illustrating a process 650 of training an additional encoder and a LAS decoder of a two-pass ASR model in accordance with various implementations. For convenience, the operations of the flowchart are described with reference to a system that performs the operations. This system may include one or more components, such as one or more processors (e.g., CPU(s), GPU(s), and/or TPU(s)). While operations of process 650 are shown in a particular order, this is not meant to be limiting. One or more operations may be reordered, omitted, and/or added.

At block 652, the system selects a training instance including (1) an instance of audio data capturing an utterance and (2) a ground truth representation of the utterance. In some implementations, the selected training instance is distinct from training instances used to train a shared encoder and/or a RNN-T decoder portion of the two-pass ASR model. In some other implementations, the selected training instance is additionally utilized to train a shared encoder and/or RNN-T decoder portion of the two-pass ASR model. In some implementations, the training instance can be generated in accordance with process 400 of FIG. 4.

At block 654, the system processes the audio data portion of the training instance using (1) a shared encoder, (2) an additional encoder, and (3) a LAS decoder to generate predicted LAS output. For example, the shared encoder can process the audio data to generate shared encoder output, the additional encoder can process the shared encoder output to generate additional encoder output, and the LAS decoder can process the additional encoder output to generate the predicted LAS output. In many implementations, the shared encoder can be previously trained while training a RNN-T decoder in accordance with process 500 of FIG. 5.

At block 656, the system generates a loss based on the ground truth representation portion of the training instance of the predicted LAS output.

At block 658, the system updates one or more portions of the additional encoder based on the LAS loss and/or updates one or more portions of the LAS decoder based on the LAS loss, while not updating the shared encoder. In other words, the previously trained shared encoder can be frozen while training the additional encoder and/or the LAS decoder.

At block 660, the system determines whether to perform any additional training. If so, the system proceeds back to block 652, selects an additional training instance, then performs an iteration of blocks 654, 656, and 658 based on the additional training instance, and then performs an additional iteration of block 660. In some implementations, the system can determine to perform more if there are one or more additional unprocessed training instances and/or if other criterion/criteria are not yet satisfied. The other criterion/criteria can include, for example, whether a threshold number of epochs have occurred and/or a threshold duration of training has occurred. Although process 650 is described with respect to a non-batch learning technique, batch learning may additionally and/or alternatively be utilized. If, at block 660, the system determines to not perform additional training, the process ends.

Figure 7:
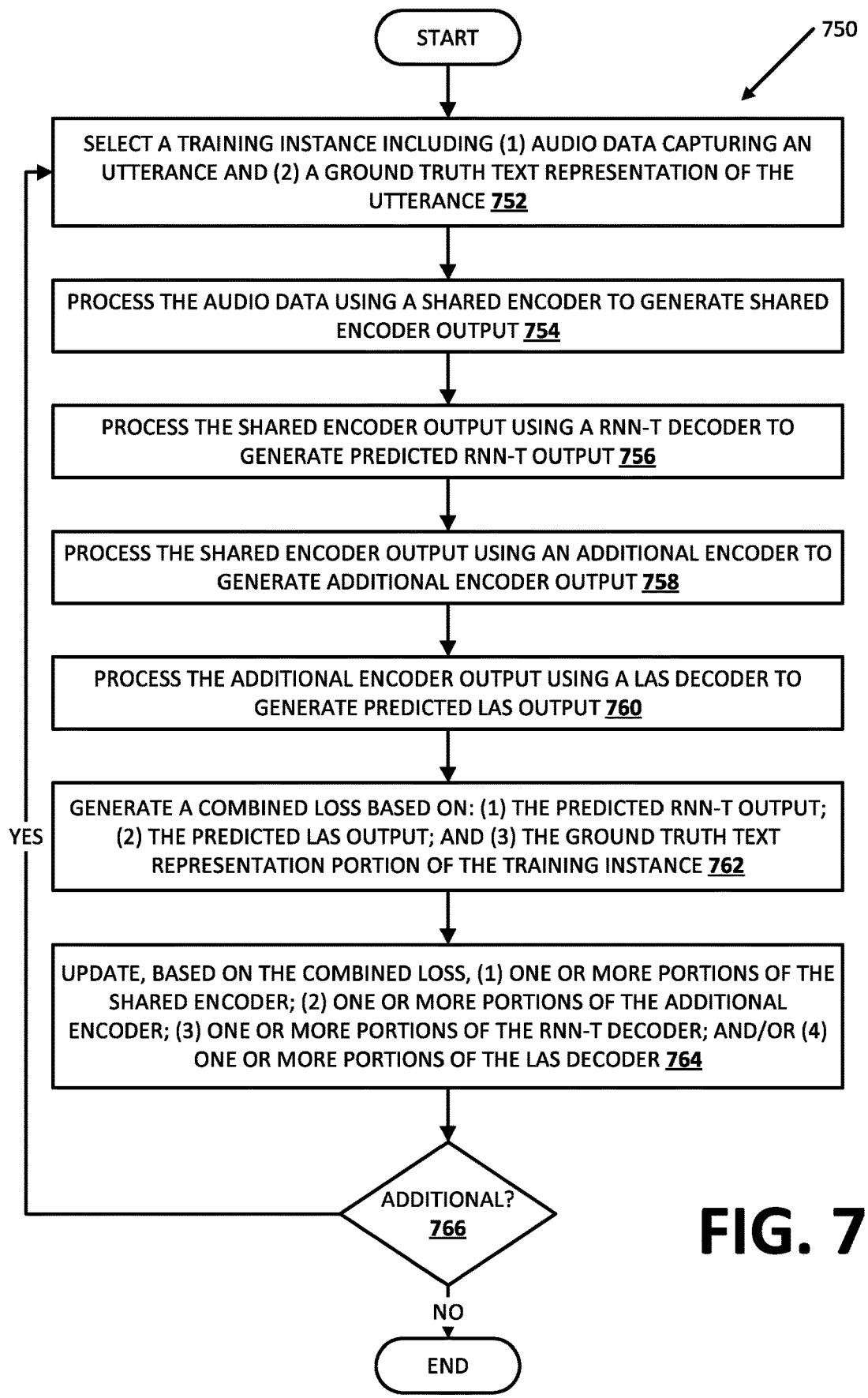
FIG. 7 is a flowchart illustrating an example process of training a two-pass ASR model in accordance with implementations disclosed herein.

FIG. 7 is a flowchart illustrating an example process 750 of jointly training a shared encoder, an additional encoder, a RNN-T decoder, and/or a LAS decoder to refine a trained two-pass ASR model in accordance with various implementations. For example, the shared encoder and/or the RNN-T decoder can be trained in accordance with process 500 of FIG. 5 and/or the additional encoder and/or LAS decoder can be trained in accordance with process 650 of FIG. 6. For convenience, the operations of the flowchart are described with reference to a system that performs the operations. This system may include one or more components, such as one or more processors (e.g., CPU(s), GPU(s), and/or TPU(s)). While operations of process 750 are shown in a particular order, this is not meant to be limiting. One or more operations may be reordered, omitted, and/or added.

At block 752, the system selects a training instance including (1) audio data capturing an utterance and (2) a ground truth text representation of the utterance. In some implementations, the selected training instance is distinct from training instances used to initially train a shared encoder, an additional encoder, a RNN-T decoder, and/or a LAS decoder of a two-pass ASR model. In some other implementations, the selected training instance is additionally utilized to initially train a shared encoder, an additional encoder, a RNN-T decoder, and/or a LAS decoder of a two-pass ASR model. In some implementations, the training instance can be generated in accordance with process 400 of FIG. 4. In some implementations, the LAS decoder can additionally be trained using MWER training (not depicted) after training the LAS decoder using the combined loss.

At block 754, the system processes the audio data using an initially trained shared encoder to generate shared encoder output. For example, the shared encoder can be initially trained in accordance with process 500 of FIG. 5.

At block 756, the system processes the shared encoder output using an initially trained RNN-T decoder to generate predicted RNN-T output. For example, the RNN-T decoder can be initially trained in accordance with process 500 of FIG. 5.

At block 758, the system processes the shared encoder output using an initially trained additional encoder to generate additional encoder output. For example, the additional encoder can be initially trained in accordance with process 650 of FIG. 6.

At block 760, the system processes the additional encoder output using an initially trained LAS decoder to generate predicted LAS output. For example, the LAS decoder can be initially trained in accordance with process 650 of FIG. 6.

At block 762, the system generates a combined loss based on: (1) the predicted RNN-T output, (2) the predicted LAS output, and (3) the ground truth text representation portion of the training instance. For example, the system can generate a combined loss of $L_{combined(x,y^*)} = \lambda L_{RNNT}(x,y^*) + (1-\lambda)L_{LAS}(x,y^*)$, where x is the instance of audio data, y* is the ground truth text representation portion of the training instance, $L_{RNNT}$ is a RNN-T loss based on the predicted RNN-T output and the ground truth text representation portion of the training instance, and $L_{LAS}$ is a LAS loss based on the predicted LAS output and the ground truth text representation portion of the training instance. Additional and alternative combined losses can be utilized in accordance with many implementations.

At block 764, the system updates, based on the combined loss, (1) one or more portions of the shared encoder; (2) one or more portions of the additional encoder; (3) one or more portions of the RNN-T decoder; and/or (4) one or more portions of the LAS decoder.

At block 766, the system determines whether to perform any additional training. If so, the system proceeds back to block 752, selects an additional training instance, then performs an iteration of blocks 754, 756, 758, 760, 762, and 764 based on the additional training instance, and then performs an additional iteration of block 766. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although process 750 is described with respect to a non-batch learning technique, batch learning may additionally and/or alternatively be utilized. If, at block 766, the system determines to not perform additional training, the process ends. In some implementations, the LAS decoder can additionally be trained using MWER training (not depicted) after training the LAS decoder using the combined loss.

FIG. 8 is a flowchart illustrating a process 850 of generating a text representation of an utterance captured in audio data using a two-pass ASR model, where the two-pass ASR model includes a shared encoder, an additional encoder, a RNN-T decoder, and a LAS decoder in accordance with various implementations. For convenience, the operations of the flowchart are described with reference to a system that performs the operations. This system may include one or more components, such as one or more processors (e.g., CPU(s), GPU(s), and/or TPU(s)). While operations of process 800 are shown in a particular order, this is not meant to be limiting. One or more operations may be reordered, omitted, and/or added.

At block 852, the system receives streaming audio data, where the audio data captures an utterance spoken by a human. In many implementations, the audio data is captured using one or more microphones of a client device. For example, the audio data can be captured using microphone(s) of a standalone interactive speaker.

At block 854, before the human has finished speaking and in a streaming manner, the system generates one or more candidate text representations of the utterance by processing the audio data using a first-pass portion of a two-pass ASR model. In many implementations, the system processes the audio data using the first-pass portion of the two-pass ASR model by (1) processing the audio data using a shared encoder to generate shared encoder output; (2) processing the shared encoder output using a RNN-T decoder to generate the one or more candidate text representations of the utterance; and (3) processing the shared encoder output using an additional encoder to generate additional encoder output.

At block 856, the system determines the human has finished speaking. In some implementations, the system can determine the human has finished speaking based on an end of query token generated using the RNN-T decoder. In some implementations, the system can determine the human has finished speaking based on an end of query token generated by processing the audio data using an endpointer model (not depicted).

At block 858, in response to determining the human has finished speaking, the system generates a text representation of the utterance using a second-pass portion of the two-pass ASR model by processing (1) the additional encoder output along with (2) the one or more candidate text representations of the utterance using a LAS decoder to generate the text representation of the utterance. In some implementations, the LAS decoder can be used to rescore the top-K hypotheses generated using the RNN-T decoder (i.e., the top-K candidate text representations generated using the RNN-T decoder). For example, the LAS decoder can be used to rescore the top three hypotheses, the top five hypotheses, the top twenty hypotheses, and/or an additional number of top hypotheses generated using the RNN-T decoder. For example, for each of the top hypotheses, the LAS decoder can be run in a teacher-forcing mode with attention on the additional encoder output, to generate a LAS score combining a probability of the candidate hypothesis and an attention parameter(s). The system can select the hypothesis with the highest LAS score as the text representation of the utterance. Additionally or alternatively, the LAS decoder can be used to rescore a tree-based lattice the top candidate text representations of the utterance represented as a lattice. For example, the LAS decoder can be used to process each lattice arc in the teacher-forcing mode with attention on the additional encoder output, to update the probability in the arc. The system can identify the text representation of the utterance as the candidate text representation with the highest probability after the probabilities are updated using the LAS decoder.

At block 860, the system performs one or more actions based on the text representation of the utterance. For example, the system can render output based on the text representation on a screen of the client device for the speaker. In some implementations, the system can render output based on one or more of the candidate text representations, such as rendering output based on the candidate text representation with the highest probability, while the human is speaking the utterance. In some such implementations, the system can render output based on the text representation by revising the output rendered while the human was speaking the utterance. Additionally or alternatively, the system can render one or more responses to the text representation of the utterance. For example, the system can render the response of "it is going to rain later today" in response to the human speaking the utterance of "what is the weather today". Additionally or alternatively, the system can control one or more client devices based on the text representation of the utterance. For example, the system can turn on four lights in the living room in response to the utterance of "turn on the living room lights". In a variety of implementations, the system can perform additional and/or alternative actions based on the final text representation of the utterance.

Figure 9:
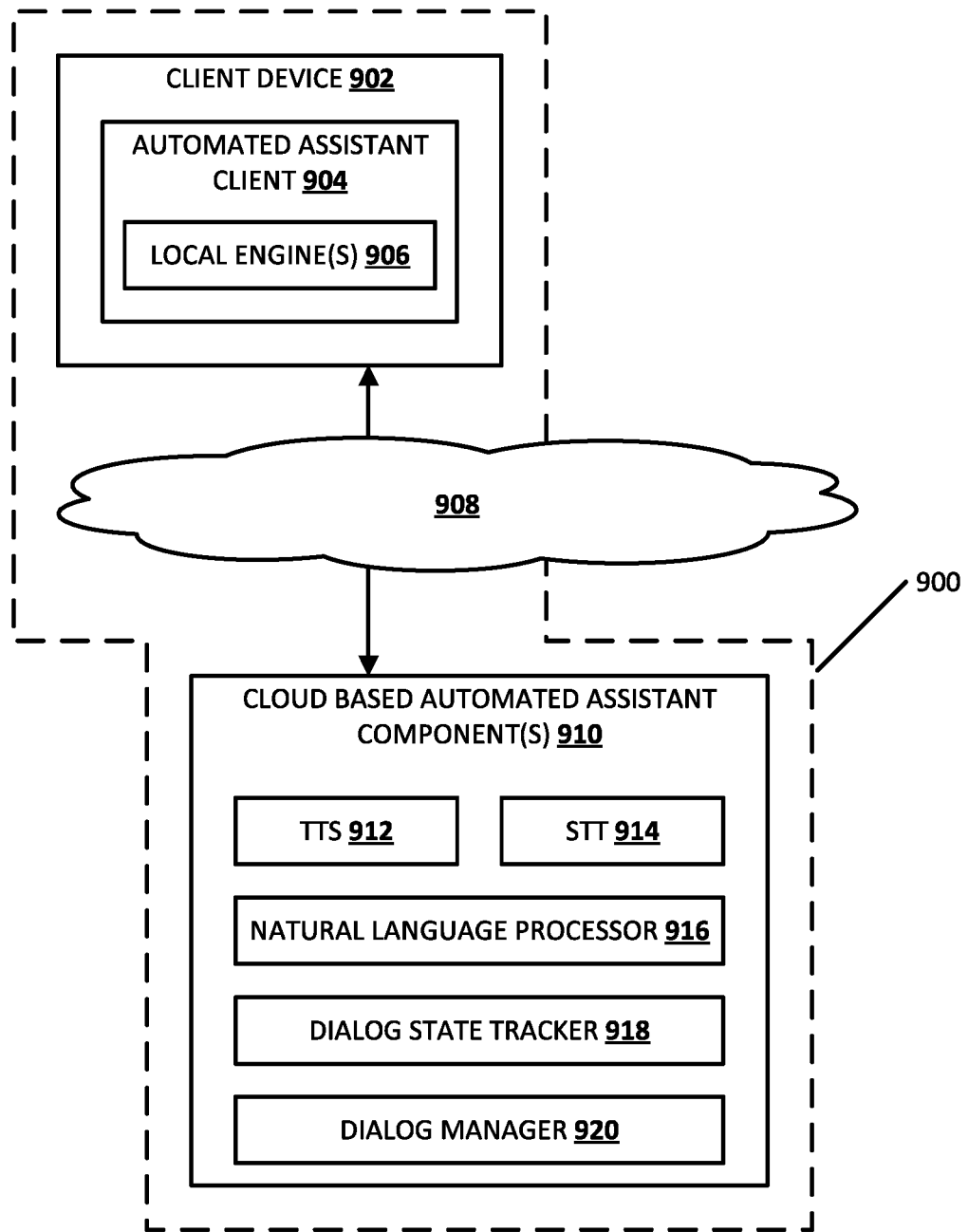
FIG. 9 illustrates a block diagram of another example environment in which implementations disclosed herein may be implemented.

Turning now to FIG. 9, an example environment is illustrated where various implementations can be performed. FIG. 9 is described initially, and includes a client computing device 902, which executes an instance of an automated assistant client 904. One or more cloud-based automated assistant components 910 can be implemented on one or more computing systems (collectively referred to as a "cloud" computing system) that are communicatively coupled to client device 902 via one or more local and/or wide area networks (e.g., the Internet) indicated generally at 908.

An instance of an automated assistant client 904, by way of its interactions with one or more cloud-based automated assistant components 910, may form what appears to be, from the user's perspective, a logical instance of an automated assistant 900 with which the user may engage in a human-to-computer dialog. An instance of such an automated assistant 900 is depicted in FIG. 9. It thus should be understood that in some implementations, a user that engages with an automated assistant client 904 executing on client device 902 may, in effect, engage with his or her own logical instance of an automated assistant 900. For the sakes of brevity and simplicity, the term "automated assistant" as used herein as "serving" a particular user will often refer to the combination of an automated assistant client 904 executing on a client device 902 operated by the user and one or more cloud-based automated assistant components 910 (which may be shared amongst multiple automated assistant clients of multiple client computing devices). It should also be understood that in some implementations, automated assistant 900 may respond to a request from any user regardless of whether the user is actually "served" by that particular instance of automated assistant 900.

The client computing device 902 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 902 may optionally operate one or more other applications that are in addition to automated assistant client 904, such as a message exchange client (e.g., SMS, MMS, online chat), a browser, and so forth. In some of those various implementations, one or more of the other applications can optionally interface (e.g., via an application programming interface) with the automated assistant 900, or include their own instance of an automated assistant application (that may also interface with the cloud-based automated assistant component(s) 910).

Automated assistant 900 engages in human-to-computer dialog sessions with a user via user interface input and output devices of the client device 902. To preserve user privacy and/or to conserve resources, in many situations a user must often explicitly invoke the automated assistant 900 before the automated assistant will fully process a spoken utterance. The explicit invocation of the automated assistant 900 can occur in response to certain user interface input received at the client device 902. For example, user interface inputs that can invoke the automated assistant 900 via the client device 902 can optionally include actuations of a hardware and/or virtual button of the client device 902. Moreover, the automated assistant client can include one or more local engines 906, such as an invocation engine that is operable to detect the presence of one or more spoken invocation phrases. The invocation engine can invoke the automated assistant 900 in response to detection of one of the spoken invocation phrases. For example, the invocation engine can invoke the automated assistant 900 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 602, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 900. As used herein, "invoking" the automated assistant 900 can include causing one or more previously inactive functions of the automated assistant 900 to be activated. For example, invoking the automated assistant 900 can include causing one or more local engines 906 and/or cloud-based automated assistant components 910 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 900.

The one or more local engine(s) 906 of automated assistant 900 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 902 is relatively constrained in terms of computing resources (e.g., processor cycles, memory, battery, etc.), the local engines 906 may have limited functionality relative to any counterparts that are included in cloud-based automated assistant components 910.

Cloud-based automated assistant components 910 leverage the virtually limitless resources of the cloud to perform more robust and/or more accurate processing of audio data, and/or other user interface input, relative to any counterparts of the local engine(s) 906. Again, in various implementations, the client device 902 can provide audio data and/or other data to the cloud-based automated assistant components 910 in response to the invocation engine detecting a spoken invocation phrase, or detecting some other explicit invocation of the automated assistant 900.

The illustrated cloud-based automated assistant components 910 include a cloud-based TTS module 912, a cloud-based STT module 914, a natural language processor 916, a dialog state tracker 918, and a dialog manager 920. In some implementations, one or more of the engines and/or modules of automated assistant 900 may be omitted, combined, and/or implemented in a component that is separate from automated assistant 900. Further, in some implementations automated assistant 900 can include additional and/or alternative engines and/or modules. Cloud-based STT module 914 can convert audio data into text, which may then be provided to natural language processor 916.

Cloud-based TTS module 912 can convert textual data (e.g., natural language responses formulated by automated assistant 900) into computer-generated speech output. In some implementations, TTS module 912 may provide the computer-generated speech output to client device 902 to be output directly, e.g., using one or more speakers. In other implementations, textual data (e.g., natural language responses) generated by automated assistant 900 may be provided to one of the local engine(s) 906, which may then convert the textual data into computer-generated speech that is output locally.

Natural language processor 916 of automated assistant 900 processes free form natural language input and generates, based on the natural language input, annotated output for use by one or more other components of the automated assistant 900. For example, the natural language processor 916 can process natural language free-form input that is textual input that is a conversion, by STT module 914, of audio data provided by a user via client device 902. The generated annotated output may include one or more annotations of the natural language input and optionally one or more (e.g., all) of the terms of the natural language input.

In some implementations, the natural language processor 916 is configured to identify and annotate various types of grammatical information in natural language input. In some implementations, the natural language processor 916 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 916 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 916 may rely on annotations from one or more other components of the natural language processor 916. In some implementations, in processing a particular natural language input, one or more components of the natural language processor 916 may use related prior input and/or other related data outside of the particular natural language input to determine one or more annotations.

In some implementations, dialog state tracker 918 may be configured to keep track of a "dialog state" that includes, for instance, a belief state of a one or more users' goals (or "intents") over the course of a human-to-computer dialog session and/or across multiple dialog sessions. In determining a dialog state, some dialog state trackers may seek to determine, based on user and system utterances in a dialog session, the most likely value(s) for slot(s) that are instantiated in the dialog. Some techniques utilize a fixed ontology that defines a set of slots and the set of values associated with those slots. Some techniques additionally or alternatively may be tailored to individual slots and/or domains. For example, some techniques may require training a model for each slot type in each domain.

Dialog manager 920 may be configured to map a current dialog state, e.g., provided by dialog state tracker 918, to one or more "responsive actions" of a plurality of candidate responsive actions that are then performed by automated assistant 900. Responsive actions may come in a variety of forms, depending on the current dialog state. For example, initial and midstream dialog states that correspond to turns of a dialog session that occur prior to a last turn (e.g., when the ultimate user-desired task is performed) may be mapped to various responsive actions that include automated assistant 900 outputting additional natural language dialog. This responsive dialog may include, for instance, requests that the user provide parameters for some action (i.e., fill slots) that dialog state tracker 918 believes the user intends to perform. In some implementations, responsive actions may include actions such as "request" (e.g., seek parameters for slot filling), "offer" (e.g., suggest an action or course of action for the user), "select," "inform" (e.g., provide the user with requested information), "no match" (e.g., notify the user that the user's last input is not understood), a command to a peripheral device (e.g., to turn off a light bulb), and so forth.

Figure 10:
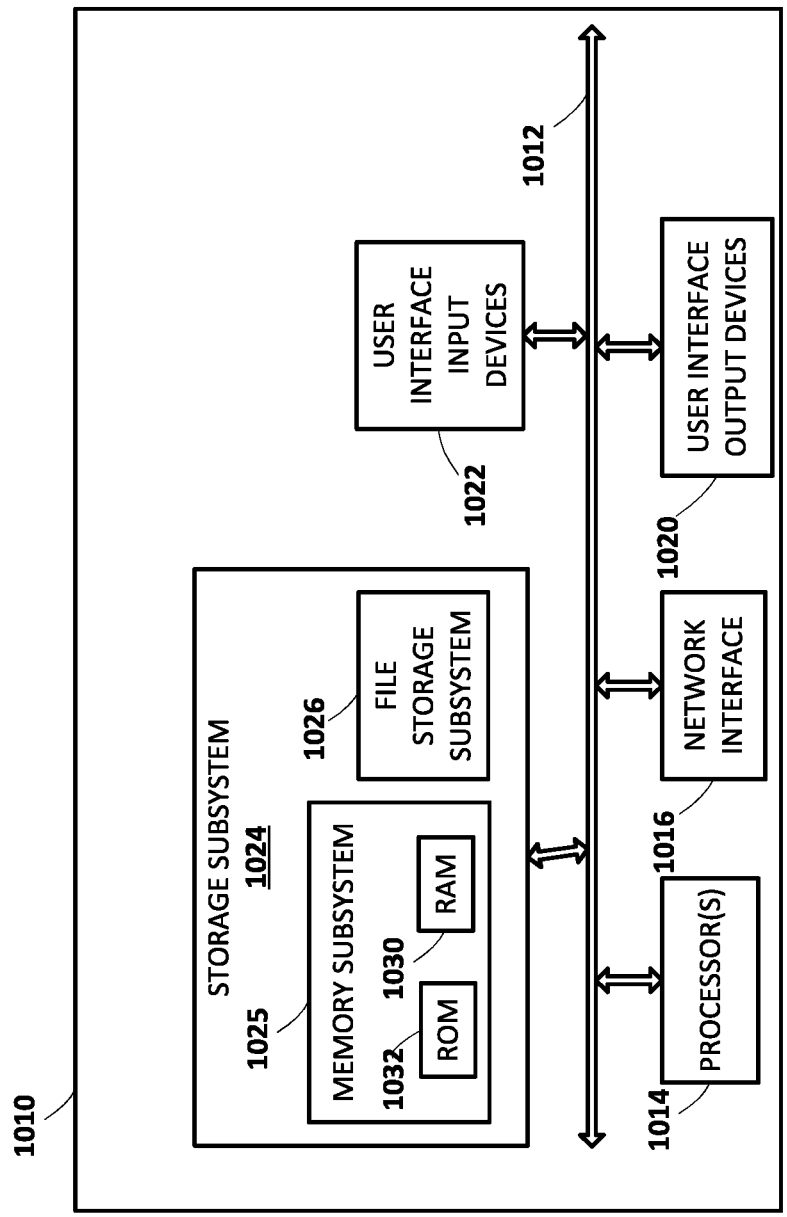
FIG. 10 illustrates an example architecture of a computing device.

FIG. 10 is a block diagram of an example computing device 1010 that may optionally be utilized to perform one or more aspects of techniques described herein. In some implementations, one or more of a client computing device, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of one or more of the processes of FIG. 4, FIG. 5, FIG. 6, FIG. 7, and/or FIG. 8 as well as to implement various components depicted in FIG. 3 and/or FIG. 9.

These software modules are generally executed by processor 1014 alone or in combination with other processors.

Memory 1025 used in the storage subsystem 1024 can include a number of memories including a main random access memory ("RAM") 1030 for storage of instructions and data during program execution and a read only memory ("ROM") 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by processor(s) is provided and includes receiving audio data that includes a sequence of segments and that captures an utterance spoken by a human speaker. The method further includes, for each of the segments, and in the sequence: processing the segment using a first-pass portion of an automatic speech recognition ("ASR") model to generate recurrent neural network transformer ("RNN-T") output. Processing each of the segments using the first-pass portion of the ASR model includes: processing the segment using a shared encoder portion to generate shared encoder output; adding the shared encoder output as the next item in a shared encoder buffer; processing the shared encoder output using a RNN-T decoder portion to generate a corresponding portion of RNN-T output; and processing the shared encoder output using an additional encoder to generate additional encoder output. The method further includes determining one or more first-pass candidate text representations of the utterance based on the RNN-T output. The method further includes determining the human speaker has finished speaking the utterance. The method further includes, in response to determining the human speaker has finished speaking the utterance: processing the shared encoder output from the shared encoder buffer using an additional encoder to generate additional encoder output; generating listen attend spell ("LAS") output based on processing, using a second-pass LAS decoder portion of the ASR model, the additional encoder output along with the (a) the RNN-T output and/or (b) the one or more first-pass candidate text representations of the utterance; and generating a final text representation of the utterance based on the LAS output.

These and other implementations of the technology can include one or more of the following features.

In some implementations, receiving the audio data includes capturing the audio data using one or more microphones of a client device.

In some implementations, the one or more first-pass candidate text representations of the utterances is a first-pass lattice representation. In some of those implementations, generating LAS output based on processing, using the second-pass LAS decoder portion of the ASR model, the additional encoder output along with the one or more first-pass candidate text representations of the utterance includes: for each lattice arc in the first-pass lattice representation, processing the lattice arc using the LAS decoder in a teacher-forcing mode with attention on the additional encoder output to update the probability of the first-pass candidate text representation corresponding to the arc; and generating the LAS output by selecting the candidate first-pass text representation with the highest updated probability.

In some implementations, the method further includes generating a plurality of training instances, where generating the plurality of training instances includes: selecting an instance of training audio data capturing a training utterance spoken by a training human speaker; determining a ground truth representation of the training utterance; and storing the training instance including the training audio data along with the ground truth text representation of the training utterance. In some of those implementations, the method further includes training the ASR model. Training the AS model can include, for each of the plurality of training instances and until one or more conditions are satisfied: processing the instance of training audio data using the shared encoder to generate shared encoder training output; processing the shared encoder training output using the RNN-T decoder to generate predicted RNN-T training output; determining a loss based on the predicted RNN-T training output and the ground truth representation of the training utterance; and updating one or more portions of the shared encoder portion based on the determined loss and/or updating one or more portions of the RNN-T decoder portion based on the determined loss. In some versions of those implementations, training the ASR model further includes, for each of the plurality of training instances and until one or more second conditions are satisfied: processing the instance of training audio data using the shared encoder to generate second shared encoder training output; processing the second shared encoder training output using the additional encoder to generate additional encoder training output; processing the additional encoder training output using the LAS decoder to generate LAS training output; determining a second loss based on the LAS training output and the ground truth representation of the training utterance; and updating one or more portions of the additional encoder based on the determined loss and/or updating one or more portions of the LAS decoder based on the determined loss. In some of those versions, training the ASR model further includes, for each of the plurality of training instances and until one or more third conditions are satisfied: processing the instance of training audio data using the shared encoder to generate third shared encoder training output; processing the third shared encoder training output using the RNN-T decoder to generate second RNN-T training output; determining a RNN-T loss based on the second RNN-T training output and the ground truth representation of the training utterance; processing the third shared encoder training output using the additional encoder to generate second additional encoder training output; processing the second additional encoder training output using the LAS decoder to generate second LAS training output; determining a LAS loss based on the second LAS training output and the ground truth representation of the training utterance; determining a common loss based on the RNN-T loss and the LAS loss; and updating one or more portions of the shared encoder based on the common loss and/or updating one or more portions of the additional encoder based on the common loss and/or updating one or more portions of the RNN-T decoder based on the common loss and/or updating one or more portions of the LAS decoder based on the common loss. Optionally, training the ASR model further includes training the LAS decoder using mean word error rate training.

In some implementations, the RNN-T output includes an end of query token indicating the human speaker has finished speaking generated using the first-pass portion of the ASR model. In some versions of those implementations, determining the human speaker has finished speaking the utterance includes determining the human speaker has finished speaking the utterance in response to identifying the end of query token in the RNN-T output. In some of those versions, the method further includes training the ASR model, and training the ASR model comprises penalizing the RNN-T decoder portion for generating the end of query token too early or too late.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:

receiving audio data comprising a sequence of segments and capturing an utterance spoken by a human speaker;

for each of the segments, and in the sequence:
processing the segment using a first-pass portion of an automatic speech recognition ("ASR") model to generate recurrent neural network transformer ("RNN-T") output, wherein processing the segment using the first-pass portion of the ASR model comprises:
processing the segment using a shared encoder portion to generate shared encoder output,
adding the shared encoder output as the next item in a shared encoder buffer, and
processing the shared encoder output using a RNN-T decoder portion to generate a corresponding portion of RNN-T output;

determining one or more first-pass candidate text representations of the utterance based on the RNN-T output;

determining the human speaker has finished speaking the utterance;

in response to determining the human speaker has finished speaking the utterance:
processing the shared encoder output from the shared encoder buffer using an additional encoder to generate additional encoder output;
generating listen attend spell ("LAS") output based on processing, using a second-pass LAS decoder portion of the ASR model, the additional encoder output along with at least one of (a) the RNN-T output or (b) the one or more first-pass candidate text representations of the utterance; and generating a final text representation of the utterance based on the LAS output.

2. The method of claim 1, wherein receiving the audio data comprising the sequence of segments and capturing the utterance spoken by the human speaker comprises capturing the audio data using one or more microphones of a client device.

3. The method of claim 1, wherein the one or more first-pass candidate text representations of the utterances is a first-pass lattice representation.

4. The method of claim 3, wherein generating LAS output based on processing, using the second-pass LAS decoder portion of the ASR model, the additional encoder output along with the one or more first-pass candidate text representations of the utterance comprises:

for each lattice arc in the first-pass lattice representation, processing the lattice arc using the LAS decoder in a teacher-forcing mode with attention on the additional encoder output to update the probability of the first-pass candidate text representation corresponding to the arc; and generating the LAS output by selecting the candidate first-pass text representation with the highest updated probability.

5. The method of claim 1, further comprising:
generating a plurality of training instances, wherein generating each training instance comprises:
selecting an instance of training audio data capturing a training utterance spoken by a training human speaker;
determining a ground truth representation of the training utterance; and
storing the training instance including the training audio data along with the ground truth text representation of the training utterance.

6. The method of claim 5, further comprising training the ASR model, wherein training the ASR model comprises:
for each of the plurality of training instances and until one or more conditions are satisfied:
processing the instance of training audio data using the shared encoder to generate shared encoder training output;
processing the shared encoder training output using the RNN-T decoder to generate predicted RNN-T training output;
determining a loss based on the predicted RNN-T training output and the ground truth representation of the training utterance;
updating one or more portions of the shared encoder portion based on the determined loss and/or updating one or more portions of the RNN-T decoder portion based on the determined loss.

7. The method of claim 6, wherein training the ASR model further comprises:
for each of the plurality of training instances and until one or more second conditions are satisfied:
processing the instance of training audio data using the shared encoder to generate second shared encoder training output;
processing the second shared encoder training output using the additional encoder to generate additional encoder training output;
processing the additional encoder training output using the LAS decoder to generate LAS training output;
determining a second loss based on the LAS training output and the ground truth representation of the training utterance; and
updating one or more portions of the additional encoder based on the determined loss and/or updating one or more portions of the LAS decoder based on the determined loss.

8. The method of claim 7, wherein training the ASR model further comprises:
for each of the plurality of training instances and until one or more third conditions are satisfied:
processing the instance of training audio data using the shared encoder to generate third shared encoder training output;
processing the third shared encoder training output using the RNN-T decoder to generate second RNN-T training output;
determining a RNN-T loss based on the second RNN-T training output and the ground truth representation of the training utterance;
processing the third shared encoder training output using the additional encoder to generate second additional encoder training output;
processing the second additional encoder training output using the LAS decoder to generate second LAS training output;
determining a LAS loss based on the second LAS training output and the ground truth representation of the training utterance;
determining a common loss based on the RNN-T loss and the LAS loss; and
updating one or more portions of the shared encoder based on the common loss and/or updating one or more portions of the additional encoder based on the common loss and/or updating one or more portions of the RNN-T decoder based on the common loss and/or updating one or more portions of the LAS decoder based on the common loss.

9. The method of claim 8, wherein training the ASR model further comprises training the LAS decoder using mean word error rate training.

10. The method of claim 1, wherein the RNN-T output includes an end of query token indicating the human speaker has finished speaking generated using the first-pass portion of the ASR model.

11. The method of claim 10, wherein determining the human speaker has finished speaking the utterance comprises determining the human speaker has finished speaking the utterance in response to identifying the end of query token in the RNN-T output.

12. The method of claim 11, wherein training the ASR model comprises penalizing the RNN-T decoder portion for generating the end of query token too early or too late.

13. A client device comprising:
one or more microphones;
memory storing instructions;
one or more processors that execute the instructions, stored in the memory, to:
receive audio data detected via the microphone, the audio data comprising a sequence of segments and capturing an utterance spoken by a human speaker;
for each of the segments, and in the sequence:
process the segment using a first-pass portion of an automatic speech recognition ("ASR") model to generate recurrent neural network transformer ("RNN-T") output, wherein in processing the segment using the first-pass portion of the ASR model one or more of the processors are to:
process the segment using a shared encoder portion to generate shared encoder output,
add the shared encoder output as the next item in a shared encoder buffer, and
process the shared encoder output using a RNN-T decoder portion to generate a corresponding portion of RNN-T output;
determine one or more first-pass candidate text representations of the utterance based on the RNN-T output;
determine the human speaker has finished speaking the utterance;
in response to determining the human speaker has finished speaking the utterance:
process the shared encoder output from the shared encoder buffer using an additional encoder to generate additional encoder output;
generate listen attend spell ("LAS") output based on processing, using a second-pass LAS decoder portion of the ASR model, the additional encoder output along with at least one of (a) the RNN-T output or (b) the one or more first-pass candidate text representations of the utterance; and
generate a final text representation of the utterance based on the LAS output.

14. A non-transitory computer-readable storage medium storing instructions executable by one or more processors of a computing system to perform a method comprising:
  receiving audio data comprising a sequence of segments and capturing an utterance spoken by a human speaker;
  for each of the segments, and in the sequence:
    processing the segment using a first-pass portion of an automatic speech recognition ("ASR") model to generate recurrent neural network transformer ("RNN-T") output, wherein processing the segment using the first-pass portion of the ASR model comprises:
      processing the segment using a shared encoder portion to generate shared encoder output,
      adding the shared encoder output as the next item in a shared encoder buffer, and
      processing the shared encoder output using a RNN-T decoder portion to generate a corresponding portion of RNN-T output;
    determining one or more first-pass candidate text representations of the utterance based on the RNN-T output;
  determining the human speaker has finished speaking the utterance;
  in response to determining the human speaker has finished speaking the utterance:
    processing the shared encoder output from the shared encoder buffer using an additional encoder to generate additional encoder output;
    generating listen attend spell ("LAS") output based on processing, using a second-pass LAS decoder portion of the ASR model, the additional encoder output along with at least one of (a) the RNN-T output or (b) the one or more first-pass candidate text representations of the utterance; and
    generating a final text representation of the utterance based on the LAS output.

* * * * *